(12) United States Patent
Fukushima

(10) Patent No.: US 8,767,095 B2
(45) Date of Patent: Jul. 1, 2014

(54) IMAGING APPARATUS, EXTERNAL FLASH CORRECTION METHOD, RECORDING MEDIUM, AND INTEGRATED CIRCUIT

(75) Inventor: Yasushi Fukushima, Osaka (JP)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 13/032,968

(22) Filed: Feb. 23, 2011

(65) Prior Publication Data

US 2011/0273591 A1 Nov. 10, 2011

(30) Foreign Application Priority Data

May 10, 2010 (JP) ................................. 2010-107844

(51) Int. Cl.
*H04N 5/262* (2006.01)
*H04N 5/222* (2006.01)
*H04N 5/235* (2006.01)
*H04N 5/228* (2006.01)

(52) U.S. Cl.
USPC ......... 348/239; 348/370; 348/362; 348/222.1

(58) Field of Classification Search
USPC ........... 348/370, 371, 224.1, 225.1, 239, 362, 348/222.1
See application file for complete search history.

(56) References Cited

U.S. PATENT DOCUMENTS

| 6,710,818 | B1 * | 3/2004 | Kasahara et al. | .......... 348/226.1 |
| 7,038,736 | B2 | 5/2006 | Tojo | |
| 7,296,286 | B2 | 11/2007 | Osawa | |
| 8,502,893 | B2 * | 8/2013 | Wada et al. | .................... 348/370 |
| 2009/0002513 | A1 * | 1/2009 | Yoshida et al. | ............. 348/222.1 |
| 2010/0091141 | A1 * | 4/2010 | Martinez et al. | ............... 348/234 |
| 2011/0001849 | A1 * | 1/2011 | Wada et al. | .................... 348/241 |
| 2011/0317029 | A1 * | 12/2011 | Fukui et al. | ................. 348/224.1 |

FOREIGN PATENT DOCUMENTS

| JP | 2002-101337 | 4/2002 | |
| JP | 2006-54921 | 2/2006 | |
| JP | 2007-306225 | 11/2007 | |
| JP | 2007306225 A * | 11/2007 | ............. H04N 5/225 |

\* cited by examiner

*Primary Examiner* — Nhan T Tran
(74) *Attorney, Agent, or Firm* — Wenderoth, Lind & Ponack, L.L.P.

(57) ABSTRACT

An image capturing unit outputs both a valid video signal (a primary video signal) and an unnecessary video signal (a secondary video signal) as an output signal; a flash detection unit detects white band interference caused by an external flash; and a flash correction unit delays the valid video signal using a first delay unit and delays the unnecessary video signal using a second delay unit. When white band interference has occurred, the outputs of the respective delay units are added together by an adding unit, generating a corrected signal. An output selection unit selects and outputs the signal from the first delay unit in normal times, and when interference caused by an external flash has occurred, selects and outputs the corrected signal.

11 Claims, 12 Drawing Sheets

IMAGING APPARATUS, EXTERNAL FLASH CORRECTION METHOD, RECORDING MEDIUM, AND INTEGRATED CIRCUIT

CROSS-REFERENCE TO RELATED APPLICATION

This application claims priority to Japanese Patent Application No 2010-107844 filed on May 10, 2010, the entire disclosure of which is hereby incorporated herein by reference.

BACKGROUND

1. Technical Field

The present technique relates to imaging apparatuses capable of reducing white band interference arising when the flash of a still camera or the like (an external flash) occurs when capturing a moving picture for a video.

2. Description of the Related Art

In recent years, imaging apparatuses that use CMOS (Complementary Metal Oxide Semiconductor) image sensors, which are compact, consume little power, capture images at high speeds, and so on, are being employed in the fields of consumer video cameras and professional video cameras.

A CMOS image sensor has various properties that are different from a CCD (Charge Coupled Device) image sensor, and the method for reading out charges accumulated in a photodiode (also denoted as "PD" hereinafter) differs as well.

In a CCD image sensor, PD charge readout is performed simultaneously for all of the pixels, which is what is known as a global shutter system. On the other hand, in a CMOS image sensor, the PD charge readout is carried out using what is known as a rolling shutter system, in which the readout timing shifts progressively line by line (pixel by pixel). For this reason, CMOS image sensors suffer from deficiencies not found in CCD image sensors because skew in the readout times of accumulated charges causes the timings of the accumulation periods for respective pixels to shift.

One such example of such a problem is a phenomenon in which white band interference occurs when a subject illuminated by the flash of a still camera or the like is captured using a video camera that employs a CMOS image sensor. "White band interference" refers here to a phenomenon in which only part of a frame in a captured image is affected by the flash, resulting in a bright image above or below a line partway through the image (that is, the upper portion of a screen or the lower portion of the screen).

This phenomenon will be described hereinafter using FIG. 9 and FIG. 10.

FIG. 9 is a diagram illustrating a scene in which both a video camera and still cameras are capturing a subject, such as a scene at a press conference.

FIG. 9 illustrates a scene including a video camera 10, a monitor 11 that displays the captured signal therefrom, still cameras 12 and 13, and a subject 14. Note that the video camera 10 employs a CMOS image sensor.

When the flashes of the still cameras 12 and 13 are used in this scene, white band interference appears in the screen of the monitor 11 that displays the captured signal from the video camera 10. The principles behind this will be described hereinafter.

FIG. 10 is a diagram schematically illustrating the charge accumulation periods (exposure periods), the readout timings, and the scanning periods of the video camera 10. FIG. 10 expresses the charge accumulation periods of the respective scanned lines that configure the screen and the scanning periods for reading out those charges using the horizontal axis as the time axis. Assuming an HD camera, the total number of scanned lines is 1,125.

Here, the frame rate for imaging is 24 frames per second.

"Monitor screen 0 interval" refers to the interval in which the captured signal of a frame 0 is output to the monitor screen or the like; here, this interval is 1/60 second. The same applies to a "monitor screen 1 interval" and so on.

For example, in a line 1, which is the uppermost line in the screen (that is, one line's worth of pixels in the imaging element of a CMOS image sensor for obtaining a video signal that forms the line 1 (with a PD provided for each pixel)), the PD accumulation (that is, the accumulation of a charge by the PD) of a frame 1 commences at exactly the time at which the monitor screen 0 interval starts, and thus the PD accumulation ends after one accumulation frame interval, or in other words, at the time at which the monitor screen 1 interval starts.

Immediately thereafter (that is, immediately after the PD accumulation has ended), the readout scanning of the accumulated charge in the accumulated PD signal of the line 1 is started, and at the same time, the PD accumulation of the following frame 2 commences (note that "accumulated charge readout" is sometimes referred to simply as "readout"). Because 1,125 lines are scanned in one output frame interval (1/60 second), the PD signal readout scanning period is 1/60/1,125≈14.8 microseconds.

Next, a line 2 commences PD accumulation at the time at which the PD readout scanning period of the line 1 in frame 0 ends. In other words, the line 2 carries out the PD accumulation and readout operations after a delay equivalent to the PD readout scanning period after those operations are performed for the line 1. The same operations as described thus far are carried out for line 3 and on.

Thus with the rolling shutter system, the charge accumulation periods of the lines of which a single frame is configured shift little by little from top to bottom, as illustrated in FIG. 10. In accordance therewith, the scanning periods of the respective lines, or in other words, the PD signal readout timing, occur immediately after the charge accumulation periods of those lines, as illustrated in FIG. 10. In other words, with the video camera 10 that employs a CMOS image sensor, the PD signal readout process is carried out sequentially in line order, with the PD signal of the line 2 being read out after the PD signal of the line 1 has been read out and so on.

Here, as shown in FIG. 10, when a flash occurs near the middle of the monitor screen 1 interval (the interval denoted as a "flash emission interval" in FIG. 10), the bright light from the flash affects the charge accumulation periods of the latter lines in frame 1 and the charge accumulation periods of the former lines in a frame 2. The flash light that occurred in the monitor screen 1 interval spans across the charge accumulation and charge readout timings of lines X and Y in frames 1 and 2, as shown in FIG. 10.

In other words, the affect of the bright light of the flash is as follows in the case illustrated in FIG. 10.

(Lines a1 of frame 1 (the lines belonging to the area indicated as "a1" in FIG. 10):

In frame 1, the area of the lines a1 before the line X is not affected by the flash light (that is, the charge accumulation period has already ended).

(Lines X to Y of frame 1 (the lines belonging to the area indicated as "a2" in FIG. 10):

The area of the lines a2 in the period from lines X to Y is affected by the flash light in frame 1, and the amount of accumulated light gradually increases.

(Line Y and on in frame 1 (the lines belonging to the area indicated as "a3" in FIG. 10):

The area of the lines a3 from the line Y on is affected by the total light amount of the flash light.

(Lines b1 of frame 2 (the lines belonging to the area indicated as "b1" in FIG. 10):

Conversely, in frame 2, the area of the lines b1 before the line X is affected by the total light amount of the flash light.

(Lines X to Y of frame 2 (the lines belonging to the area indicated as "b2" in FIG. 10):

The area of the lines b2 in the period from the lines X to Y is gradually affected less by the flash light.

(Line Y and on in frame 2 (the lines belonging to the area indicated as "b3" in FIG. 10):

In the area of the lines b3, from line Y on, the accumulation period has not yet started, and thus those lines are not affected by the flash light.

Therefore, when the period in which the flash light is emitted is only an instant and the transient periods in the areas a2 and b2 in FIG. 10 are small enough to be ignored, generally speaking, the lower half of the monitor screen 1 (the screen (image) formed by the captured signal from frame 1) is bright, as illustrated in the lower section of FIG. 10, whereas the upper half of the monitor screen 2 (the screen (image) formed by the captured signal from frame 2) is bright; this appears in video display apparatuses as white band interference. Unlike a CMOS image sensor, in an imaging apparatus that employs a CCD image sensor, the charge accumulation times of all of the lines of which a single frame is configured are the same, and thus this problem does not arise; instead, a natural image in which the entire image brightens when a flash is emitted appears.

There is thus a problem with imaging apparatuses with a CMOS image sensor in that white band interference occurs in the captured signal when an external flash of light such as a flash light or the like occurs.

The imaging apparatus disclosed in JP-2007-306225A (called "Patent Document 1" hereinafter) exists as a conventional imaging apparatus for solving this problem.

FIG. 11 is a block diagram illustrating an example of the configuration of a conventional imaging apparatus 9000. The imaging apparatus 9000 is a digital still camera that primarily records what are known as still images.

As shown in FIG. 11, the imaging apparatus 9000 includes an image capturing unit 701, an image processing unit 702, a recording display processing unit 705, a buffer 706, an evaluation unit 703, a storage unit 707, and a control unit 704.

With the conventional imaging apparatus 9000, for example, when a still image or a moving image has been captured by the image capturing unit 701 in response to a user operation, the captured image undergoes a predetermined image process in the image processing unit 702, and is then supplied to the recording display processing unit 705 and the evaluation unit 703.

The recording display processing unit 705 buffers, in the buffer 706, the image that has undergone the predetermined image process in the image processing unit 702, and the evaluation unit 703 generates an evaluation value for the image using a detection circuit and supplies that evaluation value to the control unit 704. The control unit 704 then temporarily stores the evaluation value in the storage unit 707.

A computation circuit in the control unit 704 calculates a difference value between that evaluation value and an evaluation value that is already stored in the storage unit 707, or in other words, the evaluation value generated from the image of the previous frame. If that difference value is greater than or equal to a pre-set reference value, the image is determined to have been negatively affected by an external flash, whereas if the difference value is less than the reference value, the image is determined to not have been affected by an external flash. Based on the result of the determination, the control unit 704 controls the various elements of the imaging apparatus 9000 so that, in the case where the image has been determined to have been negatively affected by the external flash, that image is discarded, whereas in the case where the image has been determined not to have been negatively affected by the external flash, that image is output.

In this manner, the conventional imaging apparatus 9000 solves the problem of white band interference caused by an external flash.

Furthermore, in order to solve the aforementioned problems, another method used by an imaging apparatus, for example, adds together two frame images that have been affected by external flash and replaces frame images that have been affected by the external flash with a frame image generated by adding the two frame images together, thereby eliminating images having white bands occurring due to the external flash.

However, with the aforementioned conventional technique, the influence of the external flash is corrected through the generation of a new image by adding together the two images that have been affected by a flash, and thus in the case where an electronic shutter function, which is a function of an imaging apparatus, is employed, there are situations where the influence of an external flash cannot be properly corrected.

FIG. 12 is a diagram schematically illustrating the charge accumulation periods (exposure periods), the readout timings, and the scanning periods of a video camera in the case where an electronic shutter function of the video camera is used. With this video camera, the charge accumulation period is $\frac{1}{24}$ second in the case where the electronic shutter function is not used; however, FIG. 12 illustrates a case where the electronic shutter function is used and the charge accumulation period is $\frac{1}{48}$ second. In other words, in the video camera illustrated in FIG. 12, the accumulated charges are discarded in exactly half of the charge accumulation periods during normal imaging when the electronic shutter is not used. In the video camera illustrated in FIG. 12, the charges accumulated in $\frac{1}{48}$-second periods, from the PD signal readout time of a frame N (where N is an integer) to the PD accumulation start time of a frame N+1 (that is, the periods indicated by the dotted line quadrangles in FIG. 12), are discarded.

Here, as shown in FIG. 12, when a flash occurs near the middle of the monitor screen 1 interval (the interval denoted as a "flash emission interval" in FIG. 12), the bright light from the flash affects the charge accumulation periods of the latter lines in frame 1. Accordingly, as in FIG. 10, the lower half of the monitor screen 1 (the screen formed by the captured signal from frame 1) is bright, as illustrated in the lower section of FIG. 12; this appears in the monitor as white band interference.

However, in the case of FIG. 12, white band interference caused by the influence of the flash does not occur in the upper half of the screen (the monitor screen 2). The reason is that in the video camera, due to the electronic shutter operation, the charges accumulated in the $\frac{1}{48}$-second periods from the PD signal readout time of frame 1 to the PD accumulation start time of frame 2 are discarded, and thus are not used as image signals.

Accordingly, in the case of FIG. 12, the influence of the flash does not appear as white band interference in the image of frame 2 (the monitor screen 2 (the screen formed by the captured signal in frame 2)). In other words, in the case of FIG. 12, the video (image) captured by the video camera includes a screen in which the lower half is bright white, but not a screen in which the upper half is bright.

For this reason, in the case of FIG. 12, even if processing according to the stated conventional technique is carried out, two screens (frame images) that have been affected by a flash cannot be added together, and thus the influence of flash light cannot be properly corrected.

In order to solve the aforementioned problem, it is an object of the present technique to provide an imaging apparatus, an external flash correction method, a program, and an integrated circuit capable of obtaining an image (video) in which the influence of a flash is properly suppressed even in the case where the image has been captured using an electronic shutter function.

SUMMARY

The present technique is an imaging apparatus including an image capturing unit, a flash detection unit, and a flash correction unit.

The image capturing unit alternately outputs one unit image's worth of a primary video signal obtained by capturing a subject image for a first exposure time and one unit image's worth of a secondary video signal obtained by capturing the subject image for a second exposure time. For example, assuming that the one unit image's worth of sequential primary video signals on the time axis are $An-1$, $An$, $An+1$, and so on, and the one unit image's worth of sequential secondary video signals on the time axis are $Bn-1$, $Bn$, $Bn+1$, and so on, the image capturing unit outputs the one unit image's worth of the primary video signal and the one unit image's worth of the secondary video signal alternately, in the following order: $Bn-1$, $An-1$, $Bn$, $An$, $Bn+1$, $An+1$, and so on.

The image capturing unit outputs the one unit image's worth of the primary video signal and the one unit image's worth of the secondary video signal at a frame cycle that is longer than both the first exposure time and the second exposure time. For example, the cycle from when the unit image (for example, a frame image) $An$ resulting from the primary video signal is output to when the unit image (for example, a frame image) $An+1$ resulting from the next primary video signal is output (that is, a frame cycle) is longer than both the first exposure time and the second exposure time.

The flash detection unit determines whether or not the influence of an external flash is present in at least one of the primary video signal and the secondary video signal.

The flash correction unit corrects the influence of the external flash by (1) outputting, in the case where the flash detection unit has determined that the influence of an external flash is present, a flash-corrected video signal obtained by adding, to the primary video signal, the secondary video signal, obtained over the second exposure time, that is temporally before or after the first exposure time over which the primary video signal was obtained, and (2) outputting, in the case where the flash detection unit has determined that the influence of an external flash is not present, the primary video signal.

According to the imaging apparatus configured as described above, a video signal that is originally unnecessary (the secondary video signal) during electronic shutter operations is output by the image capturing unit along with the normal video signal (the primary video signal). With this imaging apparatus, in the case where an upper portion or a lower portion of a single unit image (for example, a single frame image) formed by the normal video signal (the primary video signal) has become bright due to the influence of an external flash, a single unit image $Bn$ or $Bn+1$ (for example a frame image $Bn$ or $Bn+1$) formed by the originally unnecessary video signal (the secondary video signal) obtained temporally before or after a single unit image $An$ (for example, a frame image $An$) formed by the primary video signal is added to the single unit image $An$; through this, a unit image (for example, a frame image) in which the influence of the external flash has been suppressed is obtained. In other words, with this imaging apparatus, in the case where the primary video signal has been affected by an external flash, a video signal in which the entire screen is bright can be output as a result of the aforementioned process.

Accordingly, with this imaging apparatus, it is possible to properly suppress white band interference caused by an external flash from occurring in captured images, even during electronic shutter operations.

Note that "one unit image's worth" of a video signal refers to an amount of a video signal capable of forming a single screen (a single image), and corresponds to, for example, an amount of a video signal capable of forming a single frame image.

According to this technique, it is possible to realize an imaging apparatus, an external flash correction method, a recording medium, and an integrated circuit capable of obtaining an image (video) in which the influence of a flash is properly suppressed even in the case where the image has been captured using an electronic shutter function

BRIEF DESCRIPTION OF THE DRAWINGS

Referring now to the attached drawings, which form a part of this original disclosure.

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Hereinafter, embodiments of the present technique will be described using the diagrams.

First Embodiment

In the first embodiment, a case in which an imaging apparatus executes processing using an electronic shutter function will be described. Furthermore, in the present embodiment, the descriptions will be given assuming that the exposure time for a single frame (that is, the accumulation time of a signal charge) is approximately equal to ½ of the signal readout cycle determined by the imaging frame rate (that is, a single frame interval). For example, in the case where the imaging frame rate is 24 frames per second and both one frame interval and the signal readout cycle are 1/24 second, the exposure time is 1/48 second. Finally, the signal charge readout period is assumed to be 1/60 second.

<1.1: Configuration of Imaging Apparatus>

Figure 1:
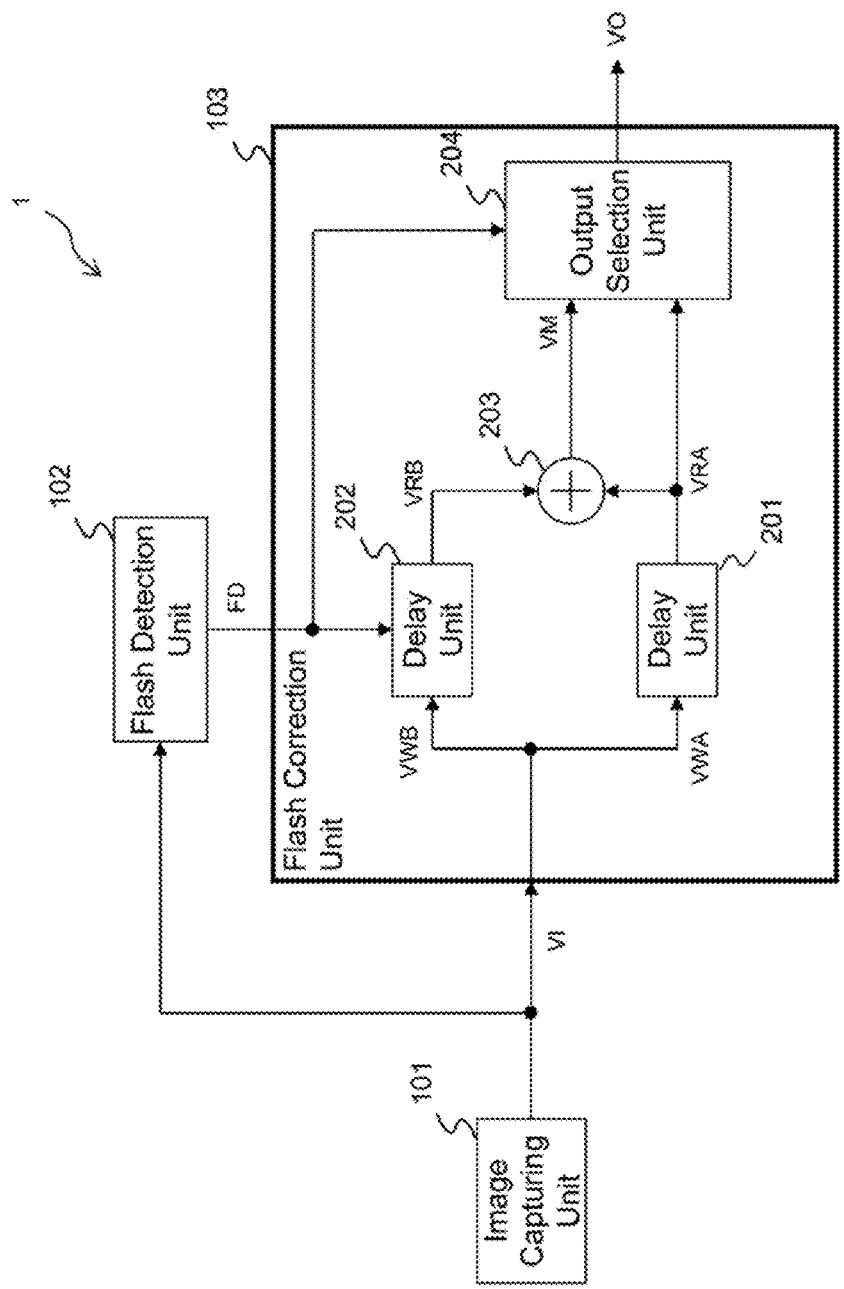
FIG. 1 is a block diagram illustrating the configuration of an imaging apparatus according to a first embodiment.

FIG. 1 is a diagram illustrating the overall configuration of an imaging apparatus 1 according to the present embodiment.

As shown in FIG. 1, the imaging apparatus 1 includes an image capturing unit 101, a flash detection unit 102, and a flash correction unit 103. The flash correction unit 103, meanwhile, includes a delay unit 201, a delay unit 202, an adding unit 203, and an output selection unit 204.

The image capturing unit 101 is provided with a CMOS image sensor, and converts an optical image (that is, light from a subject), formed upon the surface of an imaging element in the CMOS image sensor by light that has entered into the CMOS image sensor through a lens (optical system) provided in the image capturing unit 101, into an electric signal through photoelectric conversion. The image capturing unit 101 carries out charge accumulation, charge readout, and A/D (analog to digital) conversion on a line-by-line basis, generating a captured signal. The image capturing unit 101 furthermore carries out processes such as white balance and the like on the generated captured signal. Then, the image capturing unit 101 outputs the signal on which the aforementioned processing has been carried out to the flash detection unit 102 and the flash correction unit 103 as a video signal VI.

Figure 12:
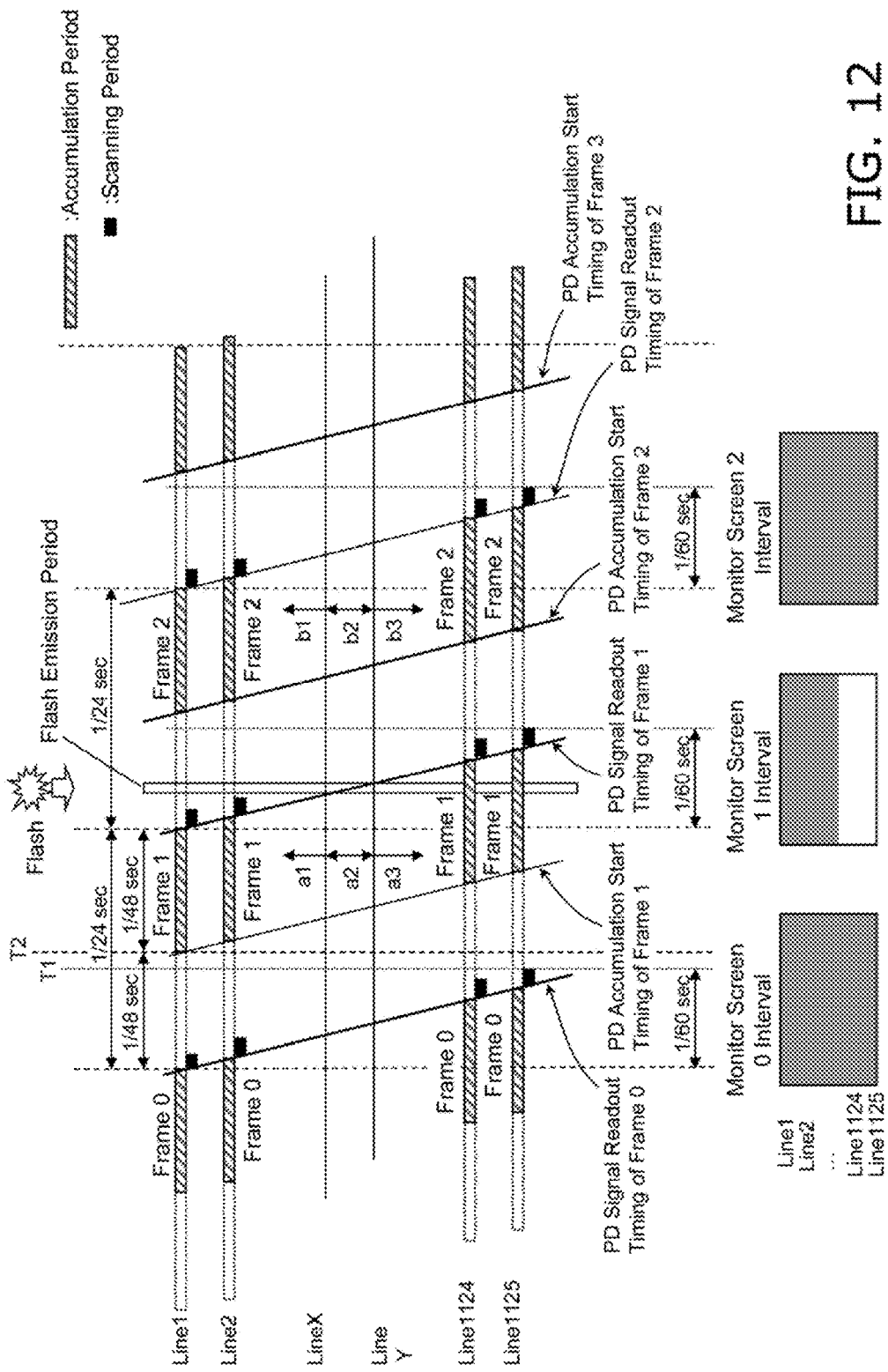
FIG. 12 is a descriptive diagram illustrating the principles behind the occurrence of white band interference caused by an external flash in an imaging apparatus that employs a CMOS image sensor.

Note that when the electronic shutter function is operational, the image capturing unit 101 outputs a normal video signal (for example, a video signal obtained by reading out the charges accumulated in the pixels of the CMOS image sensor in the periods indicated as "accumulation times" in FIG. 12) to the flash detection unit 102 and the flash correction unit 103. Furthermore, when the electronic shutter function is operational, the image capturing unit 101 also outputs a video signal formed using charges that are conventionally unnecessary and are therefore discarded (for example, a video signal obtained by reading out the charges accumulated in the pixels of the CMOS image sensor in the periods from the PD signal readout time of a frame N (where N is an integer) to the PD accumulation start time of a frame N+1 in FIG. 12 (that is, the periods indicated by the dotted line quadrangles in FIG. 12) to the flash detection unit 102 and the flash correction unit 103.

Note that when the electronic shutter function is operational, the image capturing unit 101 may, for example, carry out the following processing in order to read out the video signal formed using the charges that are conventionally unnecessary and are therefore discarded (in other words, a secondary video signal). That is, the image capturing unit 101 reads out the stated secondary video signal by reading out the accumulated charges of the pixels in the CMOS image sensor instead of a reset processing (an operation for resetting the accumulated charges of the pixels in the CMOS image sensor) used in a conventional imaging apparatus in order to discard unnecessary charges when the electronic shutter function is operational.

The flash detection unit 102 takes, as its input, the video signal VI output from the image capturing unit 101. The flash detection unit 102 determines whether or not an image formed by the video signal VI has been affected by an external flash based on the video signal VI output from the image capturing unit 101. The flash detection unit 102 then outputs, to the flash correction unit 103, a flash detection signal FD, which is a signal indicating information of the result of the aforementioned determination.

Note that the detection of an external flash by the flash detection unit 102 is carried out, for example, through the following (1) through (3).

(1) The average value of each line (a line average value) is calculated for an image formed by the input video signal VI (for example, a frame image), or the average value of pixel values (for example, luminosity values) is calculated for each of predetermined blocks within the image (that is, a block average value).

(2) Based on the result of the calculation performed in the process (1), changes within the screen (that is, changes within a single frame) of the image formed by the video signal VI (for example, a frame image), changes among frames, and so on are detected.

(3) In the case where the amount of the change detected in the process (2) is greater than a predetermined value, it is determined that the image formed by the video signal VI (for example, a frame image) has been affected by an external flash. On the other hand, in the case where the amount of the change detected in the process (2) is less than or equal to the predetermined value, it is determined that the image formed by the video signal VI (for example, a frame image) has not been affected by an external flash.

The flash correction unit 103 takes, as its input, the video signal VI output from the image capturing unit 101 and the flash detection signal FD output from the flash detection unit 102. In accordance with the flash detection signal from the flash detection unit 102 indicating whether or not the image has been affected by an external flash, the flash correction unit 103 carries out an image correction process, an image modification process, or the like on the video signal VI from the image capturing unit 101, and outputs the processed video signal as a video signal VO.

<1.2: Operations of Imaging Apparatus>

Operations of the imaging apparatus 1 configured as described above will be described hereinafter with reference to FIGS. 2 through 4.

A characteristic of the imaging apparatus 1 according to the present embodiment is that in addition to the normal video signal output from the image capturing unit 101 in the case where the electronic shutter function is used (for example, a video signal obtained by reading out the charges accumulated by the pixels in the CMOS image sensor during the period indicated as the accumulation time in FIG. 12), the video signal formed by the charges that are unnecessary and are therefore discarded in the case where the electronic shutter function is used (for example, a video signal obtained by reading out the charges accumulated in the pixels of the CMOS image sensor in the periods from the PD signal readout time of a frame N (where N is an integer) to the PD accumulation start time of a frame N+1 in FIG. 12 (that is, the periods indicated by the dotted line quadrangles in FIG. 12) is also output from the image capturing unit 101 and used.

Here, the normal video signal output from the image capturing unit 101 when the electronic shutter function is used (that is, the signal that is originally supposed to be used when using the electronic shutter function) will be referred to as a "primary video signal". On the other hand, the video signal formed using charges that are unnecessary and are therefore discarded when the electronic shutter function is used (that is, the signal that is originally supposed to be discarded when using the electronic shutter function) will be referred to as the "secondary video signal".

In the imaging apparatus 1, both the primary video signal and the secondary video signal are output from the image capturing unit 101 in 1/24 second during a single frame interval. Here, the amount of time required to output a signal for the entire screen (that is, a video signal of an amount that can form a single frame image) is 1/60 second; this is shorter than 1/48 second, and thus it is possible for both the primary video signal and the secondary video signal to be obtained (output) from the image capturing unit 101.

(Because the signal charge readout period of 1/60 second is less than 1/48 second, a time T1 shown in FIG. 12 falls before a time T2. For this reason, even if there is only one set of outputs for reading out the accumulated charges from the pixels in the CMOS image sensor of the image capturing unit 101, both the primary video signal and the secondary video signal can be obtained from the image capturing unit 101.)

(1.2.1: When a Flash has not Occurred (the Case Illustrated in FIG. 2))

First, operations of the imaging apparatus 1 in the case where a flash has not occurred will be described.

Figure 2:
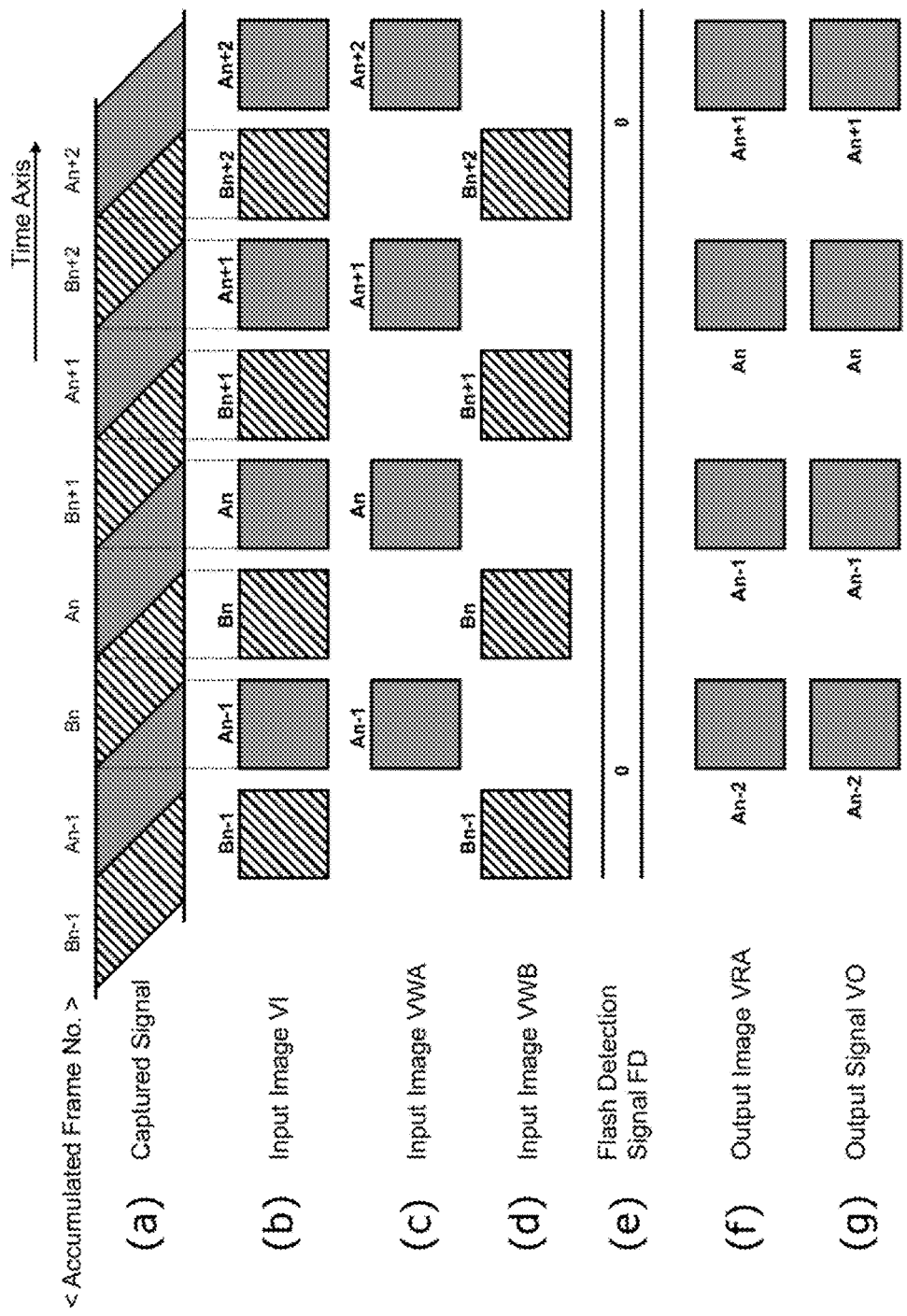
FIG. 2 is a diagram illustrating the state of an image in the various elements of the imaging apparatus according to the first embodiment.

FIG. 2 is a diagram illustrating a captured signal and a video signal (image signal) (that is, a displayed image formed by a video signal (image signal)) handled by the imaging apparatus 1 according to the present embodiment, and schematically illustrates a captured signal and a video signal (image signal) of the imaging apparatus 1 in the case where a flash has not occurred. In other words, FIG. 2 is a diagram illustrating the relationship between video signals VI, VWA, VWB, VRA, VO, and the flash detection signal FD along the time axis.

Like FIG. 12, which illustrates the conventional technique, FIG. 2(a) schematically illustrates the charge accumulation period (exposure period), readout timing, and scanning period of the image capturing unit 101, and expresses the charge accumulation periods and scanning periods for reading out those charges for each of the scanning lines of which the screen is configured using the horizontal axis as the time axis.

Meanwhile, FIG. 2(b) illustrates the video signal VI output from the image capturing unit 101 as individual frame screens (that is, the frame images in individual frames). As illustrated in FIG. 2(b), the primary video signal and the secondary video signal are output from the image capturing unit 101 in an alternating manner as the video signal VI. Here, the primary video signal of the nth (where n is an integer) frame is indicated as An, whereas the secondary video signal of the nth frame is indicated as Bn.

At this time, the video signal VI output from the image capturing unit 101 is, as shown in FIG. 2(b), output in the following order: Bn−1, An−1, Bn, An, Bn+1, An+1, Bn+2, and An+2.

The video signal VI output from the image capturing unit 101 is input into the two delay units 201 and 202 of the flash correction unit 103. Here, the delay unit 201 is a delay unit (for example, a delay circuit) for the primary video signal, whereas the delay unit 202 is a delay unit (for example, a delay circuit) for the secondary video signal.

In other words, the video signals VWA input into the delay unit 201 are, as shown in FIG. 2(c), the primary video signals An−1, An, An+1, and An+2, whereas the video signals VWB input into the delay unit 202 are, as shown in FIG. 2(d), the secondary video signals Bn−1, Bn, Bn+1, and Bn+2.

In the delay unit 201, a delay process of one frame interval is carried out on the primary video signal. Accordingly, the video signal VRA, which is the output of the delay unit 201 (that is, the video signal indicated in FIG. 2(f)), is a signal in which the input video signal VWA has been delayed by one frame interval. The video signal VRA output from the delay unit 201 is input to the adding unit 203 and the output selection unit 204. Note that the delay unit 201 is configured using, for example, a frame memory. In the case where the delay unit 201 is configured using a frame memory, the primary video signal is written into the frame memory only during the period when the primary video signal is being output from the image capturing unit 101 (this period is specified using a synchronization signal or the like (not shown)), and the written primary video signal is then read out from the frame memory after one frame interval has passed. The read-out primary video signal is then output to the adding unit 203 and the output selection unit 204.

Meanwhile, the delay unit 202 executes the following processes (1) to (3) on the secondary video signal based on the flash detection signal FD indicated in FIG. 2(e).

(1) In the case where the flash detection signal FD indicates a determination result of "no" for external flash influence, or in other words, in the case where the flash detection signal FD is "0", the delay unit 202 does not output a video signal.

(2) In the case where the flash detection signal FD indicates a determination result of "yes in the lower portion of the screen" for external flash influence, or in other words, in the case where the flash detection signal FD is "1", the delay unit 202 executes a delay process of ½ frame interval on the secondary video signal and outputs the signal obtained by delaying the secondary video signal by ½ frame interval as the video signal VRB.

(3) In the case where the flash detection signal FD indicates a determination result of "yes in the upper portion of the screen" for external flash influence, or in other words, in the case where the flash detection signal FD is "2", the delay unit 202 executes a delay process of 3/2 frame intervals on the secondary video signal and outputs the signal obtained by delaying the secondary video signal by 3/2 frame intervals as the video signal VRB.

Note that the delay unit 202 is configured using, for example, a frame memory. In the case where the delay unit 202 is configured using a frame memory, the secondary video signal is written into the frame memory only during the period when the secondary video signal is being output from the image capturing unit 101 (this period is specified using a synchronization signal or the like (not shown)), and the written secondary video signal is then read out from the frame memory after a predetermined time has passed. The read-out secondary video signal is then input to the adding unit 203.

In the case of FIG. 2, the flash detection signal FD is "0", and thus the delay unit 202 does not output a video signal.

The adding unit 203 takes, as its input, the video signal VRA output from the delay unit 201 and the video signal VRB output from the delay unit 202. The adding unit 203 adds the video signal VRA output from the delay unit 201 and the video signal VRB output from the delay unit 202, thus generating a video signal VM. The adding unit 203 then outputs the generated video signal VM to the output selection unit 204.

The output selection unit 204 takes, as its input, the flash detection signal FD output from the flash detection unit 102, the video signal VM output from the adding unit 203, and the video signal VRA output from the delay unit 201. The output selection unit 204 selects either the video signal VM or the video signal VRA based on the flash detection signal FD, and outputs the selected signal as the video signal VO.

Specifically, the output selection unit 204 carries out the following processes.

(1) In the case where the flash detection signal FD indicates a determination result of "no" for external flash influence, or in other words, in the case where the flash detection signal FD is "0", the output selection unit 204 selects the video signal VRA and outputs the video signal VRA as the video signal VO.

(2) In the case where the flash detection signal FD indicates a determination result of "yes" for external flash influence ("yes in the lower portion of the screen" for external flash influence or "yes in the upper portion of the screen" for external flash influence), or in other words, in the case where the flash detection signal FD is "1" or "2", the output selection unit 204 selects the video signal VM and outputs the video signal VM as the video signal VO.

In the case of FIG. 2, the flash detection signal FD is "0", and thus the output selection unit 204 continually selects the video signal VRA. Accordingly, in the case of FIG. 2, the video signal VRA is continually output as the video signal VO, as shown in FIG. 2(g).

(1.2.2: When a Flash has Occurred (the Case Illustrated in FIG. 3))

Next, operations of the imaging apparatus 1 in the case where a flash has occurred (the case of FIG. 3) will be described.

Figure 3:
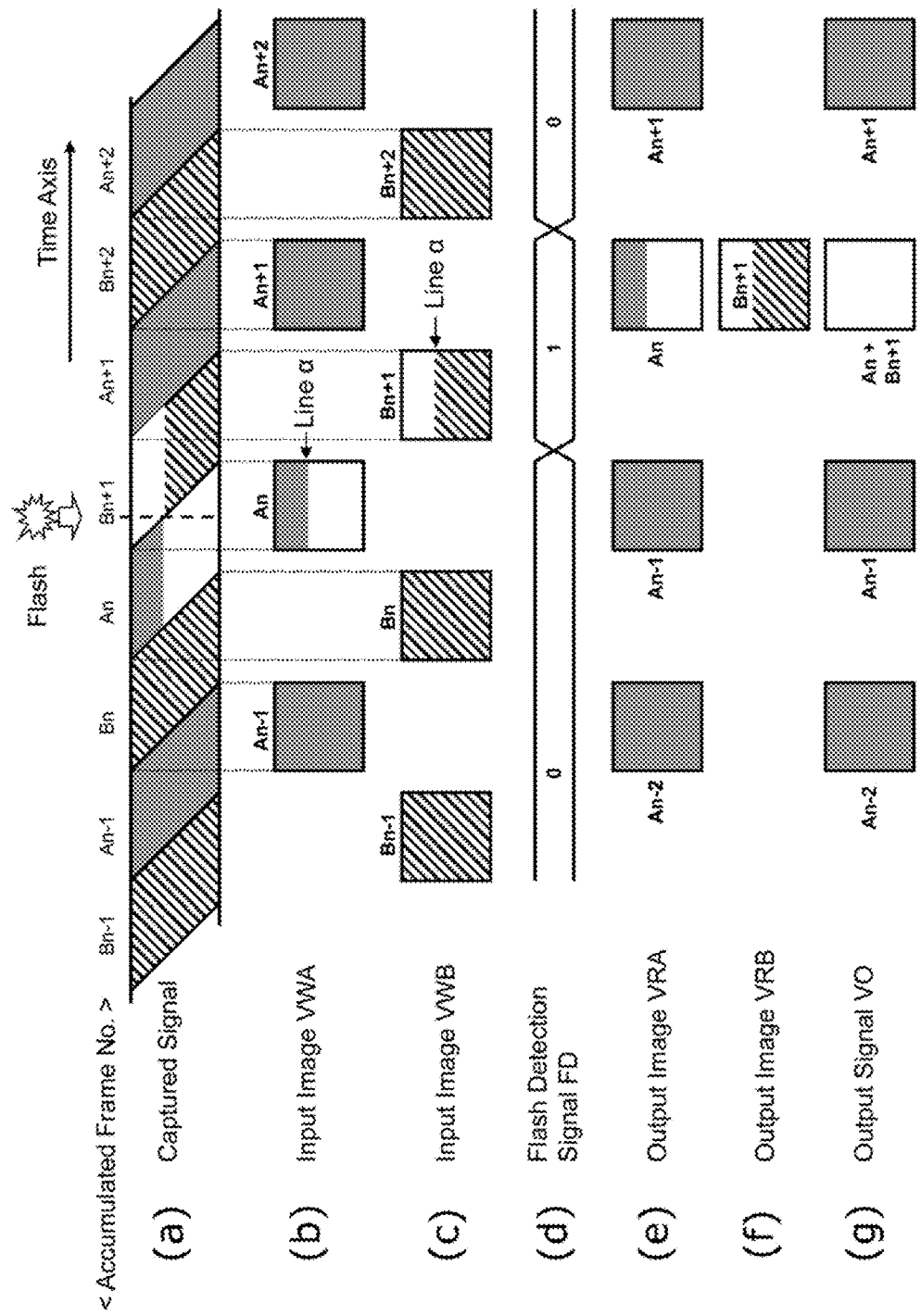
FIG. 3 is a diagram illustrating the state of an image in the various elements of the imaging apparatus according to the first embodiment.

FIG. 3 is a diagram illustrating operations performed by the imaging apparatus 1 in the case where an external flash has occurred at the same timing as illustrated in FIG. 12.

FIG. 3 is a diagram schematically illustrating the influence of a flash on an image (video) formed by the video signals VWA, VWB, VRA, VRB, and VO, and their relationship with the flash detection signal FD, along the time axis.

Here, in the case where an external flash such as a camera flash has occurred while the image capturing unit 101 is reading out the captured signal of the nth frame from the imaging element (CMOS image sensor), the captured signal output from the image capturing unit 101 has been affected by the flash, and thus, as indicated by the video signal VWA shown in FIG. 3(b), the lower portion of the image An in the nth frame (that is, the portion below a line α) has become bright. This video signal VWA is the primary video signal, and is input into the delay unit 201.

Meanwhile, the secondary video signal has also been affected by the external flash, and is thus bright in the upper portion of the image Bn+1 in the n+1th frame (that is, the portion above the line α). The secondary video signal is input from the image capturing unit 101 to the delay unit 202 as the video signal VWB.

Here, the flash detection unit 102 monitors the influence of the external flash on the image in the video signal VWA, and detects white band interference in the lower portion of the image An. In this case, as shown in FIG. 3, the flash detection unit 102 sets the signal value of the flash detection signal FD indicated in FIG. 3(d) to a signal value of "1" indicating "yes in the lower portion of the screen" for external flash influence, and outputs this signal value until detection results are obtained for the next frame An+1. Note that the flash detection signal FD may be a signal having a signal level that indicates a signal value of "1".

For example, (1) when the flash detection unit 102 outputs a flash detection signal FD having a signal value of "0", the flash detection unit 102 may set the signal level of the flash detection signal FD to within a range from a voltage V0_L to a voltage V0_H and output that flash detection signal FD;

(2) when the flash detection unit 102 outputs a flash detection signal FD having a signal value of "1", the flash detection unit 102 may set the signal level of the flash detection signal FD to within a range from a voltage V1_L to a voltage V1_H and output that flash detection signal FD; and (3) when the flash detection unit 102 outputs a flash detection signal FD having a signal value of "2", the flash detection unit 102 may set the signal level of the flash detection signal FD to within a range from a voltage V2_L to a voltage V2_H and output that flash detection signal FD.

(4) when the flash detection unit 102 outputs a flash detection signal FD having a signal value of "3", the flash detection unit 102 may set the signal level of the flash detection signal FD to within a range from a voltage V3_L to a voltage V3_H and output that flash detection signal FD.

Note that in order to properly distinguish between signal values from "0" to "3", it is desirable for the voltage ranges V0_L to V0_H, V1_L to V1_H, V2_L to V2_H and V3_L to V3_H to each be a separate range (that is, ranges that do not overlap with each other).

Also, the flash detection signal FD may be a digital signal whose bit length is two or more. For example, assuming that the flash detection signal FD is 2 bit digital signal, signal values from "0" to "3" (0x00-0x03) may be transmitted by the 2 bit digital signal.

The delay unit 201 then outputs the video signal VRA indicated in FIG. 3(e).

In addition, when the flash detection signal FD is "1", the delay unit 202 outputs the video signal VRB that forms the frame image Bn+1 at the time at which the delay unit 201 outputs a valid video signal An, as shown in FIG. 3(f).

Then, the adding unit 203 adds the video signal VRA that forms the image An and the video signal VRB that forms the image Bn+1 (that is, adds the signal values of the video signal VRA and the signal values of the video signal VRB that correspond to the pixels in the same coordinate locations in a two-dimensional image). Next, the video signal obtained by the addition performed by the adding unit 203 is output into the output selection unit 204 as an added signal VM.

The output selection unit 204: (1) selects the video signal VRA and outputs the selected video signal VRA as the video signal VO in the case where the flash detection signal FD is "0" (that is, the case where there is no flash influence); and (2) selects the signal VM output by the adding unit 203 and outputs the selected video signal VM as the output signal VO in the case where the flash detection signal FD is "1" (that is, in the case where there is flash influence in the lower portion of the screen).

As a result, with the imaging apparatus 1, a frame image (video signal) generated by adding the frame image An (that is, the video signal VRA corresponding to An) and the frame image Bn+1 (that is, the video signal VRB corresponding to Bn+1) is output instead of the frame image An, as indicated by the video signal VO illustrated in FIG. 3g).

(1.2.3: When a Flash has Occurred (the Case Illustrated in FIG. 4))

Next, operations of the imaging apparatus 1 in the case where a flash has occurred (the case of FIG. 4) will be described.

Figure 4:
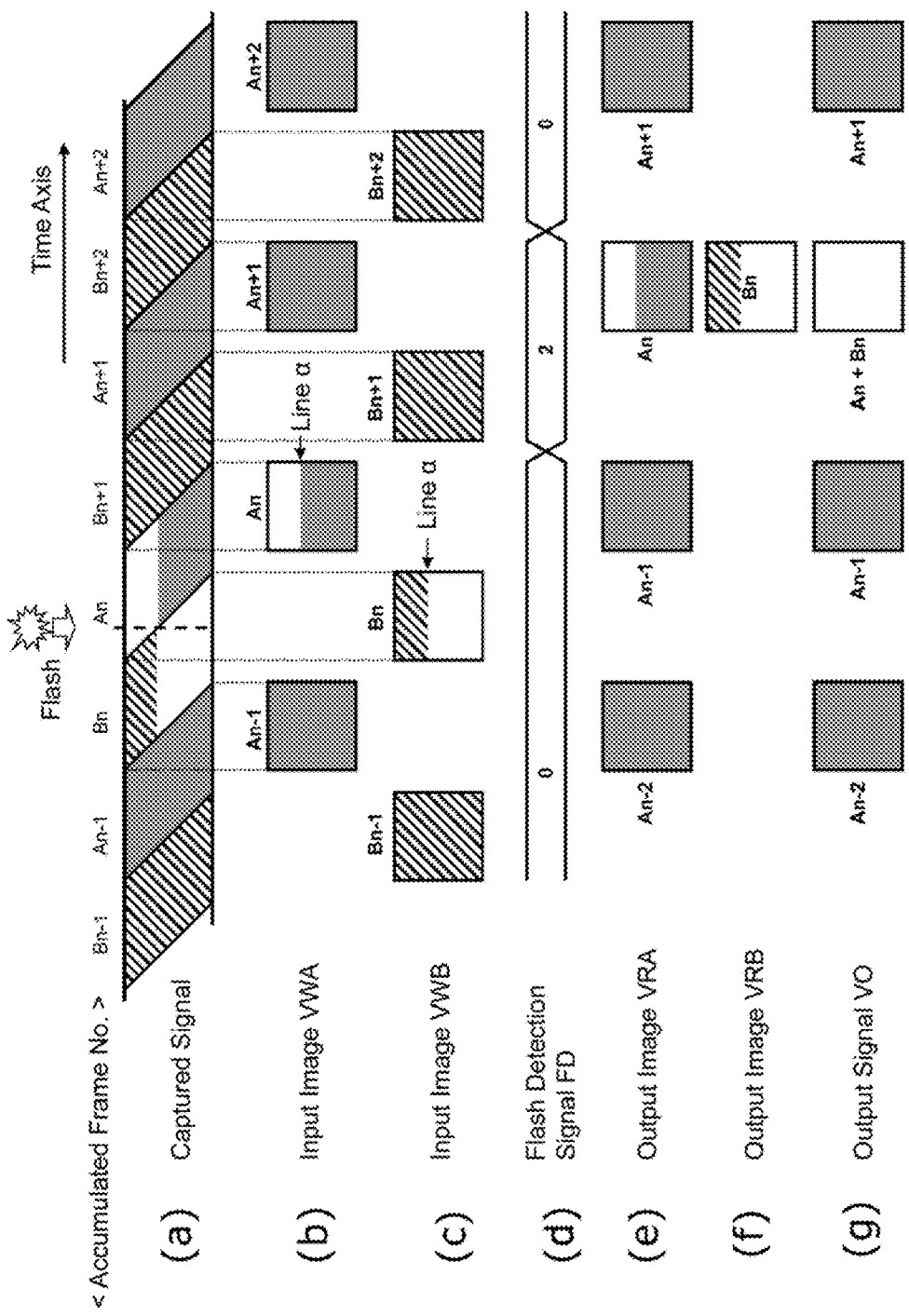
FIG. 4 is a diagram illustrating the state of an image in the various elements of the imaging apparatus according to the first embodiment.

FIG. 4 is a diagram illustrating operations performed by the imaging apparatus 1 in the case where an external flash has occurred at a different timing than that shown in FIG. 3. Like FIG. 3, FIG. 4 is a diagram schematically illustrating the influence of a flash on an image (video) formed by the video signals VWA, VWB, VRA, VRB, and VO, and their relationship with the flash detection signal FD, along the time axis.

In the case of FIG. 4, an external flash has occurred during the charge signal accumulation start scanning period of the frame An (that is, the interval from the PD (photodiode) accumulation start time of the first line in the frame An to the PD (photodiode) accumulation start time of the last line in the frame An). At this time, the captured signal output from the image capturing unit 101 is bright in the upper portion of the image An in the nth frame (that is, the portion above the line α) due to a flash, as indicated by the video signal VWA shown in FIG. 4(b). White band interference does not occur in the frame images An−1 and An+1 before and after that frame image. This video signal VWA is the primary video signal originally necessary when the electronic shutter function is operational, and this video signal VWA is input into the delay unit 201.

On the other hand, the secondary video signal, which is the video signal generated from the accumulated charges not used and thus discarded when the electronic shutter function is operational, has been affected by the flash, and the lower portion of the image Bn in the nth frame thereof (that is, the portion below the line α) is bright. The secondary video signal is input to the delay unit 202 as the video signal VWB.

Here, the flash detection unit 102 monitors the influence of the external flash on the image in the video signal VWA, and detects interference in the upper portion of the image An. In this case, as shown in FIG. 4, the flash detection unit 102 sets the signal value of the flash detection signal FD indicated in FIG. 4(d) to a signal value of "2" indicating that there is flash influence in the upper portion of the screen, and outputs this signal value until detection results are obtained for the next frame An+1.

The delay unit 201 then outputs the video signal VRA indicated in FIG. 4(e).

In addition, when the flash detection signal FD is "2", the delay unit 202 outputs the video signal VRB that forms the frame image Bn at the timing at which the delay unit 201 outputs a valid video signal An, as shown in FIG. 4(f).

Then, the adding unit 203 adds the video signal VRA that forms the image An and the video signal VRB that forms the image Bn (that is, adds the signal values of the video signal VRA and the signal values of the video signal VRB that correspond to the pixels in the same coordinate locations in a two-dimensional image). Next, the video signal obtained by the addition performed by the adding unit 203 is input to the output selection unit 204 as an added signal VM.

The output selection unit 204: (1) selects the video signal VRA and outputs the selected video signal VRA as the video signal VO in the case where the flash detection signal FD is "0" (that is, the case where there is no flash influence); and (2) selects the output signal VM from the adding unit 203 and outputs the selected video signal VM as the output signal VO in the case where the flash detection signal FD is "2" (that is, the case where there is flash influence in the upper portion of the screen (the starting position (line position) determined to have flash influence is within the charge readout period of the secondary video signal)).

As a result, with the imaging apparatus 1, a frame image (video signal) generated by adding the frame image An (that is, the video signal VRA corresponding to An) and the frame image Bn (that is, the video signal VRB corresponding to Bn) is output instead of the frame image An, as indicated by the video signal VO illustrated in FIG. 4(g).

As described thus far, with the imaging apparatus 1 according to the present embodiment, the video signal that is normally discarded (the secondary video signal) is obtained (output) from the image capturing unit 101 in the case where the electronic shutter function is operational, and is used in the flash correction process along with the normal video signal (the primary video signal). In other words, with the imaging apparatus 1, a video signal in which the influence of a flash is properly suppressed is generated by adding the video signal corresponding to a frame image in which the upper portion of the screen is bright due to a flash and the video signal corresponding to a frame image in which the lower portion of the screen is bright due to the flash. Through this, the video (image) obtained by the imaging apparatus 1 is a video (image) in which white band interference caused by an external flash is properly suppressed even when the electronic shutter is operational.

Second Embodiment

As in the first embodiment, in the second embodiment, the descriptions will be given assuming that the exposure time for a single frame (that is, the accumulation time of a signal charge) is approximately equal to ½ of the signal readout cycle determined by the imaging frame rate (that is, a single frame interval). For example, in the case where the imaging frame rate is 24 frames per second and both one frame interval and the signal readout cycle are 1/24 second, the exposure time is 1/48 second. Note, however, that unlike the first embodiment, the signal charge readout period is assumed to be 1/120 second.

Furthermore, in the present embodiment, elements that are identical to those of the first embodiment are assigned the same reference numerals, and detailed descriptions thereof will be omitted.

<2.1: Configuration of Imaging Apparatus>

Figure 5:
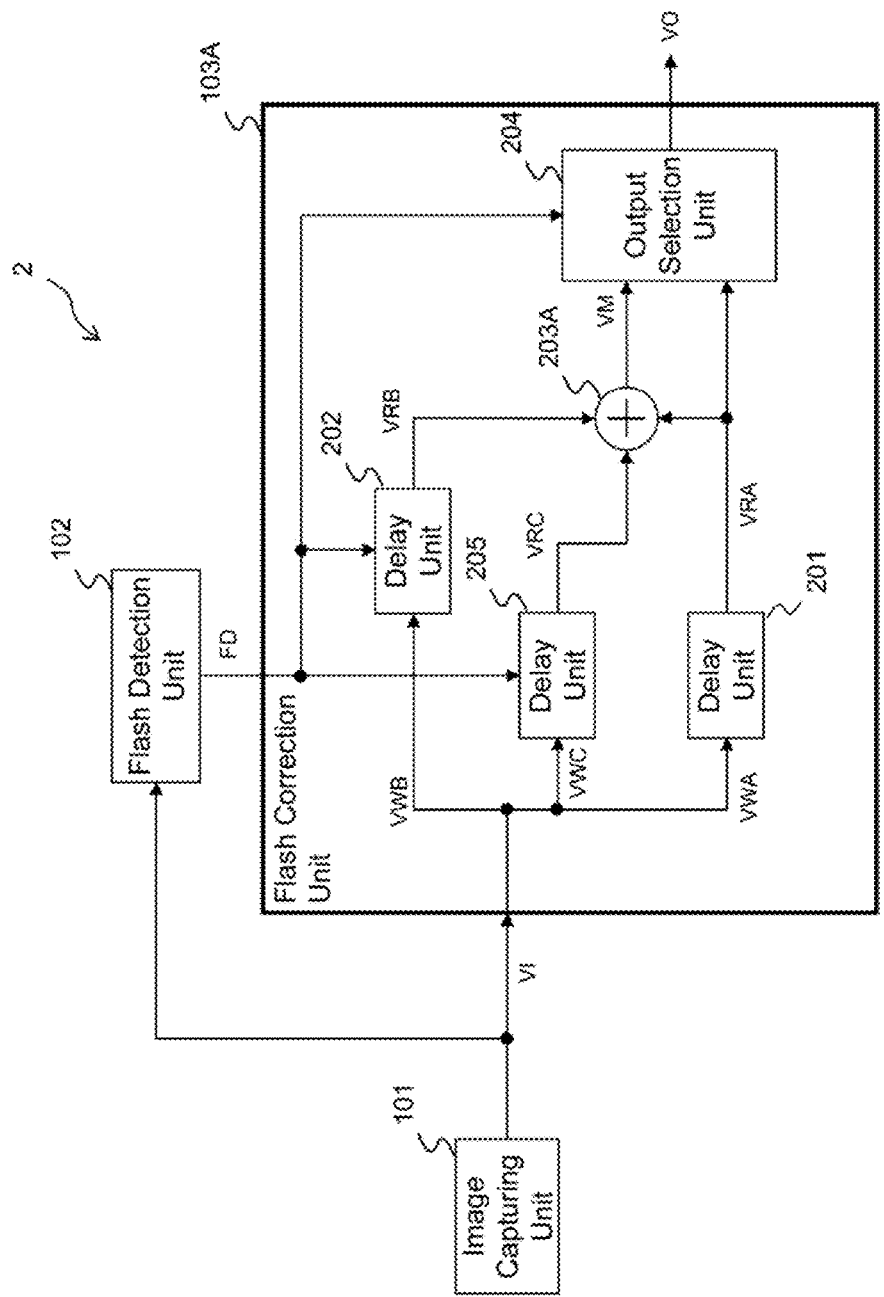
FIG. 5 is a block diagram illustrating the configuration of an imaging apparatus according to a second embodiment.

FIG. 5 is a diagram illustrating the overall configuration of an imaging apparatus 2 according to the present embodiment.

As shown in FIG. 5, the imaging apparatus 2 includes an image capturing unit 101, a flash detection unit 102, and a flash correction unit 103A. The flash correction unit 103A, meanwhile, includes a delay unit 201, a delay unit 202, a delay unit 205, an adding unit 203A, and an output selection unit 204, as shown in FIG. 5.

<2.2: Operations of Imaging Apparatus>

Operations of the imaging apparatus 2 configured as described above will be described hereinafter with reference to FIGS. 6 through 7.

A characteristic of the imaging apparatus 2 according to the embodiment is, like the first embodiment, that in addition to the primary video signal, which is a normal video signal output from the image capturing unit 101 in the case where the electronic shutter function is used, the secondary video signal, which is a video signal formed by the charges that are unnecessary and are therefore discarded in the case where the electronic shutter function is used, is also output from the image capturing unit 101 and used. However, unlike the first embodiment, the imaging apparatus 2 according to the present embodiment uses multiple secondary video signals.

In other words, in the 1/24 second that makes up a single frame interval, the exposure time of the primary video signal is 1/48 second, and the remaining 1/48-second interval is further divided into two 1/96-second intervals. In these 1/96-second intervals obtained through this division, the secondary video signals formed by the charges accumulated in those periods are used by the imaging apparatus 2 as a first secondary video signal and a second secondary video signal.

With the imaging apparatus 2 according to the present embodiment, the amount of time necessary to output a signal that forms the entire screen of a single frame image is 1/120 second, and because this is shorter than the aforementioned 1/96 second, the two secondary video signals can be obtained (output) from the image capturing unit 101 within the 1/96-second time intervals.

Figure 6:
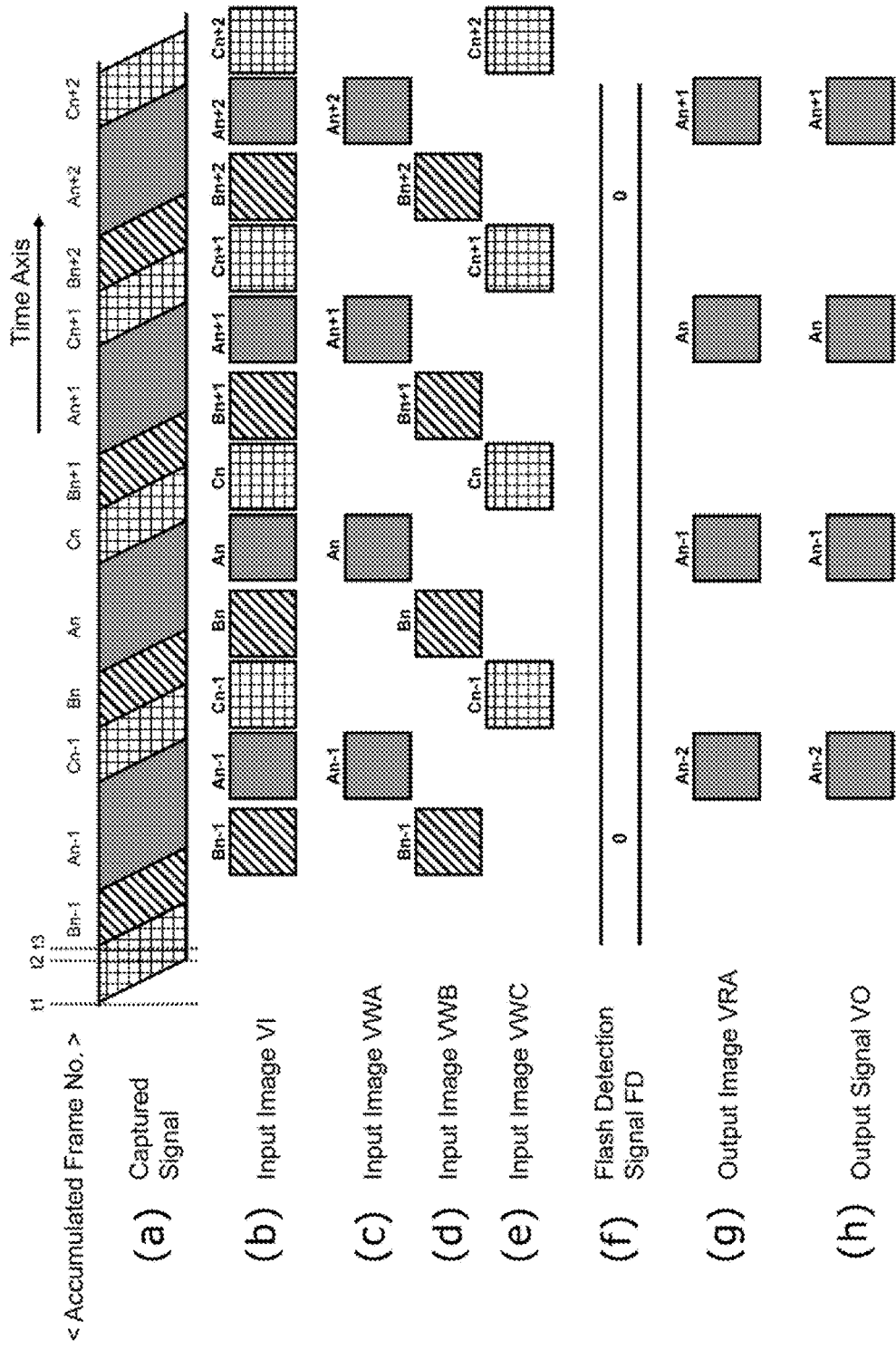
FIG. 6 is a diagram illustrating the state of an image in the various elements of the imaging apparatus according to the second embodiment.

(Because the signal charge readout period of 1/120 second is less than 1/96 second (in FIG. 6, the period from a time t1 to a time t2 is 1/120 second, and the period from the time t1 to a time t3 is 1/96 second), the time t2 illustrated in FIG. 6 is a time that is previous to the time t3. For this reason, even if there is only one set of outputs for reading out the accumulated charges from the pixels in the CMOS image sensor of the image capturing unit 101, the three video signals, or the primary video signal, the first secondary video signal, and the second secondary video signal, can be obtained from the image capturing unit 101.)

In other words, the image capturing unit 101 can output the three video signals, or the primary video signal, the first secondary video signal, and the second secondary video signal.

(2.2.1: When a Flash has not Occurred (the Case Illustrated in FIG. 6))

FIG. 6 is a diagram illustrating a captured signal and a video signal (image signal) (that is, a displayed image formed by a video signal (image signal)) handled by the imaging apparatus 2 according to the present embodiment, and schematically illustrates a case where a flash has not occurred. In other words, FIG. 6 is a diagram illustrating the relationship between the video signals VI, VWA, VWB, VWC, VRA, VO, and the flash detection signal FD along the time axis.

As with FIG. 2 described in the first embodiment, FIG. 6(a) schematically illustrates the charge accumulation period (exposure period), readout timing, and scanning period of the image capturing unit 101. Meanwhile, FIG. 6(b) is a diagram illustrating the video signal VI output from the image capturing unit 101 as individual frame screens (that is, the frame images in individual frames). As illustrated in FIG. 6(b), the primary video signal, the first secondary video signal, and the second secondary video signal are output from the image capturing unit 101 in an alternating manner as the video signal VI. Here, the primary video signal of the nth (where n is an integer) frame is indicated as An, the first secondary video signal of the nth frame is indicated as Bn, and the second secondary video signal of the nth frame is indicated as Cn. Note that as shown in FIG. 6, the order along the time axis places the first secondary video signal Bn before the primary video signal An and the second secondary video signal Cn after the primary video signal An.

At this time, the video signal VI is output from the image capturing unit 101 in the following order, as shown in FIG. 6(b): Bn−1, An−1, Cn−1, Bn, An, Cn, Bn+1, An+1, Cn+1, Bn+2, An+2, and Cn+2.

The video signal VI output from the image capturing unit 101 is input into the three delay units 201, 202, and 205 of the flash correction unit 103. Here, the delay unit 201 is a delay unit (for example, a delay circuit) for the primary video signal, the delay unit 202 is a delay unit (for example, a delay circuit) for the first secondary video signal, and the delay unit 205 is a delay unit (for example, a delay circuit) for the second secondary video signal.

In other words, the video signals VWA input into the delay unit 201 are the primary video signals An−1, An, An+1, and An+2, as shown in FIG. 6(c); the video signals VWB input into the delay unit 202 are the first secondary video signals Bn−1, Bn, Bn+1, and Bn+2, as shown in FIG. 6(d); and the video signals VWC input into the delay unit 205 are the second secondary video signals Cn−1, Cn, Cn+1, and Cn+2, as shown in FIG. 6(e).

In the delay unit 201, a delay process of one frame interval is carried out on the primary video signal. Accordingly, the video signal VRA, which is the output of the delay unit 201 (that is, the video signal indicated in FIG. 6(g)), is a signal in which the input video signal VWA has been delayed by one frame interval. The video signal VRA output from the delay unit 201 is input to the adding unit 203A and the output selection unit 204.

Meanwhile, the delay unit 202 executes the following processes (1) and (2) on the first secondary video signal based on the flash detection signal FD indicated in FIG. 6(f).

(1) In the case where the flash detection signal FD indicates a determination result of "no" for external flash influence, or in other words, in the case where the flash detection signal FD is "0", the delay unit 202 does not output a video signal.

(2) In the case where the flash detection signal FD indicates a determination result of "yes in the upper portion of the screen" for external flash influence, or in other words, in the case where the flash detection signal FD is "2", the delay unit 202 executes a delay process of 3/2 frame intervals on the first secondary video signal and outputs the signal obtained by delaying the first secondary video signal by 3/2 frame intervals as the video signal VRB.

Furthermore, the delay unit 205 executes the following processes (1) and (2) on the second secondary video signal based on the flash detection signal FD indicated in FIG. 6(f).

(1) In the case where the flash detection signal FD indicates a determination result of "no" for external flash influence, or in other words, in the case where the flash detection signal FD is "0", the delay unit 205 does not output a video signal.

(2) In the case where the flash detection signal FD indicates a determination result of "yes in the lower portion of the screen" for external flash influence, or in other words, in the case where the flash detection signal FD is "1", the delay unit 205 executes a delay process of 3/4 frame interval on the second secondary video signal and outputs the signal obtained by delaying the second secondary video signal by 3/4 frame interval as the video signal VRC.

In the case of FIG. 6, the flash detection signal FD is "0", and thus the output selection unit 204 continually selects the video signal VRA. Accordingly, in the case of FIG. 6, the video signal VRA is continually output as the video signal VO, as shown in FIG. 6(h).

(2.2.2: When a Flash has Occurred (the Case Illustrated in FIG. 7))

Next, operations of the imaging apparatus 2 in the case where a flash has occurred (the case of FIG. 7) will be described.

Figure 7:
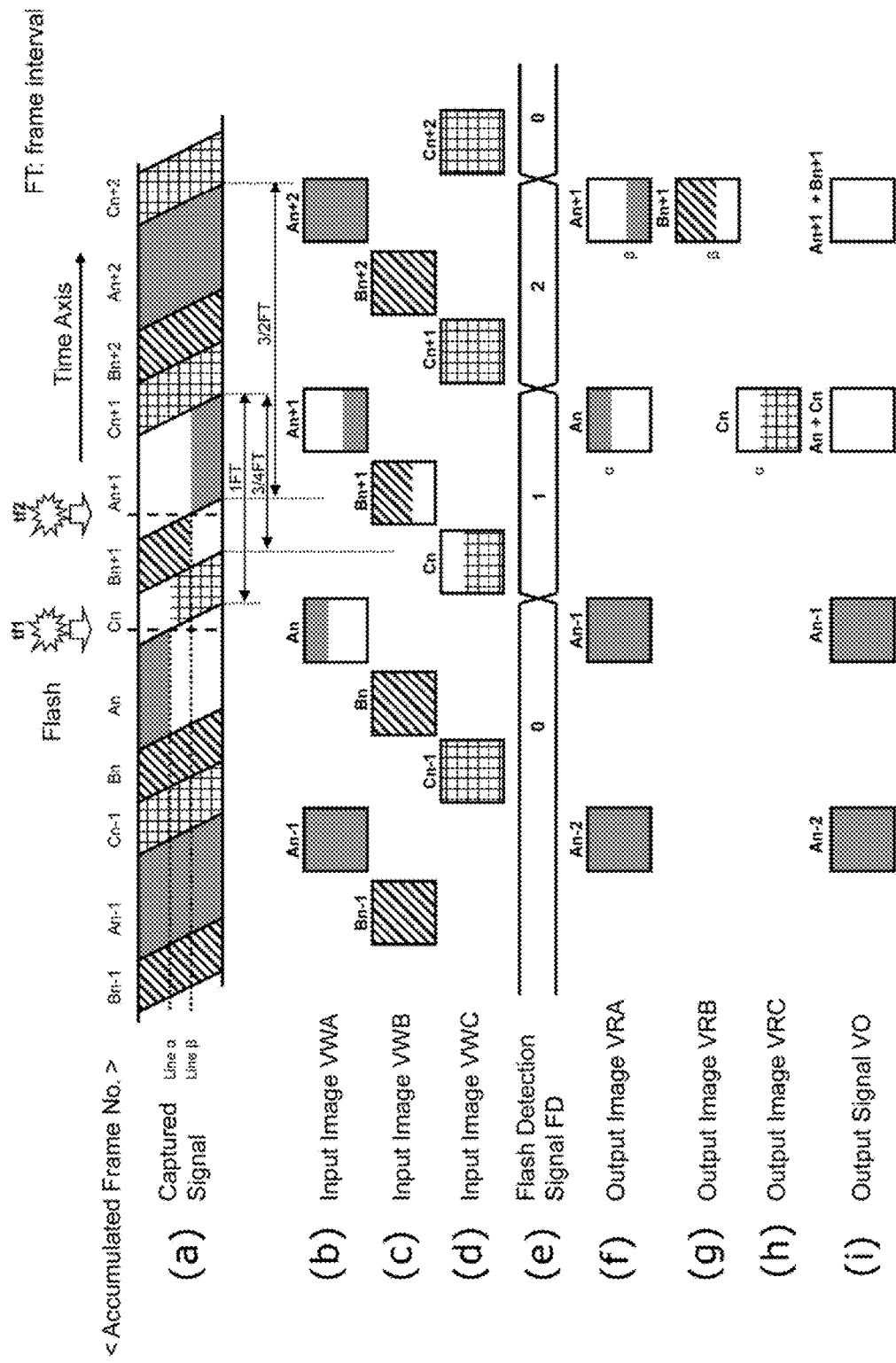
FIG. 7 is a diagram illustrating the state of an image in the various elements of the imaging apparatus according to the second embodiment.

FIG. 7 is a diagram illustrating operations performed by the imaging apparatus 2 in the case where an external flash has occurred.

FIG. 7 is a diagram schematically illustrating the influence of a flash on an image (video) formed by the video signals VWA, VWB, VWC, VRA, VRB, VRC, and VO, and their relationship with the flash detection signal FD, along the time axis. Note that as shown in FIG. 7, it is assumed that two external flashes occur (that is, an external flash occurs at two different times (a time tf1 and a time tf2)).

<First External Flash>

First, a process performed by the imaging apparatus 2 in response to the first external flash (the external flash occurring at the time tf1) will be described.

Here, in the case where an external flash such as a camera flash has occurred while the image capturing unit 101 is reading out the captured signal of the nth frame from the imaging element (CMOS image sensor), the captured signal output from the image capturing unit 101 has been affected by the flash, and thus, as indicated by the video signal VWA shown in FIG. 7(b), the lower portion of the image An in the nth frame (that is, the portion below the line α) has become bright. This video signal VWA is the primary video signal, and is input into the delay unit 201.

Meanwhile, the second secondary video signal has also been affected by the external flash, and the upper portion of the image Cn in the nth frame (that is, the portion above the line α) is bright. The second secondary video signal is input from the image capturing unit 101 to the delay unit 205 as the video signal VWC.

Here, the flash detection unit 102 monitors the influence of the external flash on the image in the video signal VWA, and detects white band interference in the lower portion of the image An. In this case, as shown in FIG. 7, the flash detection unit 102 sets the signal value of the flash detection signal FD indicated in FIG. 7(e) to a signal value of "1" indicating "yes in the lower portion of the screen" for external flash influence (that is, sets a signal value of "1" indicating that the influence of the external flash has started in the charge readout period of the primary video signal), and outputs this signal value until detection results are obtained for the next frame An+1.

The delay unit 201 then outputs the video signal VRA indicated in FIG. 7(f).

In addition, when the flash detection signal FD is "1", the delay unit 205 outputs the video signal VRC that forms the frame image Cn at the timing at which the delay unit 201 outputs a valid video signal An, as shown in FIG. 7(h).

Then, the adding unit 203A adds the video signal VRA that forms the image An and the video signal VRC that forms the image Cn (that is, adds the signal values of the video signal VRA and the signal values of the video signal VRC that correspond to the pixels in the same coordinate locations in a two-dimensional image). Next, the video signal obtained by the addition performed by the adding unit 203A is output to the output selection unit 204 as an added signal VM.

The output selection unit 204: (1) selects the video signal VRA and outputs the selected video signal VRA as the video signal VO in the case where the flash detection signal FD is "0" (that is, the case where there is no flash influence); and (2) selects the video signal VM output from the adding unit 203A and outputs the selected video signal VM as the video signal VO in the case where the flash detection signal FD is "1" (that is, the case where there is flash influence in the lower portion of the screen).

As a result, with the imaging apparatus 2, a frame image (video signal) generated by adding the frame image An (that is, the video signal VRA corresponding to An) and the frame image Cn (that is, the video signal VRC corresponding to Cn), or in other words, a frame image (video signal) in which the entire screen is bright, is outputted, as indicated by the video signal VO shown in FIG. 7(i).

<Second External Flash>

Next, a process performed by the imaging apparatus 2 in response to the second external flash (the external flash occurring at the time tf2) will be described.

The second external flash occurs during the charge signal accumulation start scanning period of the frame An+1 (that is, the interval from the PD (photodiode) accumulation start time of the first line in the frame An+1 to the PD (photodiode) accumulation start time of the last line in the frame An+1). At this time, the captured signal output from the image capturing unit 101 is bright in the upper portion of the image An+1 in the n+1th frame (that is, the portion above a line β) due to a flash, as indicated by the video signal VWA shown in FIG. 7(b). This video signal VWA is input into the delay unit 201.

On the other hand, the first secondary video signal, which is not used and is thus discarded when the electronic shutter function is operational, has been affected by the flash, and the lower portion of the image Bn+1 in the n+1th frame thereof (that is, the portion below the line β) is bright. The first secondary video signal is input to the delay unit 202 as the video signal VWB.

Here, the flash detection unit 102 monitors the influence of the external flash on the image in the video signal VWA, and detects interference in the upper portion of the image An+1. In this case, as shown in FIG. 7, the flash detection unit 102 sets the signal value of the flash detection signal FD indicated in FIG. 7(e) to a signal value of "2" indicating that there is flash influence in the upper portion of the screen, and outputs this signal value until detection results are obtained for the next frame An+2.

The delay unit 201 then outputs the video signal VRA indicated in FIG. 7(f).

In addition, when the flash detection signal FD is "2", the delay unit 202 outputs the video signal VRB that forms the frame image Bn+1 at the timing at which the delay unit 201 outputs a valid video signal An+1, as shown in FIG. 7(g).

Then, the adding unit 203A adds the video signal VRA that forms the image An+1 and the video signal VRB that forms the image Bn+1 (that is, adds the signal values of the video signal VRA and the signal values of the video signal VRB that correspond to the pixels in the same coordinate locations in a two-dimensional image). Next, the video signal obtained by the addition performed by the adding unit 203A is output to the output selection unit 204 as an added signal VM.

The output selection unit 204: (1) selects the video signal VRA and outputs the selected video signal VRA as the video signal VO in the case where the flash detection signal FD is "0" (that is, the case where there is no flash influence); and (2) selects the output signal VM from the adding unit 203A and outputs the selected video signal VM as the output signal VO in the case where the flash detection signal FD is "2" (that is, the case where there is flash influence in the upper portion of the screen (the starting position (line position) determined to have flash influence is within the charge readout period of the secondary video signal)).

As a result, with the imaging apparatus 2, a frame image (video signal) generated by adding the frame image An+1 (that is, the video signal VRA corresponding to An+1) and the frame image Bn+1 (that is, the video signal VRB corresponding to Bn+1), or in other words, a frame image (video signal) in which the entire screen is bright, is output instead of the frame image An+1, as indicated by the video signal VO illustrated in FIG. 7(i).

Here, if the imaging apparatus 2 according to the present embodiment is configured in the same manner as in the first embodiment, the two video signals in the frame Cn and the frame Bn+1 will intermix, making it difficult to execute a proper flash correction process; however, with the imaging apparatus 2 according to the present embodiment, the aforementioned process can be executed without the two external flashes affecting each other, thus making it possible to carry out a proper flash correction process even in a case such as that shown in FIG. 7.

As described thus far, with the imaging apparatus 2 according to the present embodiment, the video signal that is normally discarded (that is, the secondary video signals (the first secondary video signal and the second secondary video signal)) in the case where the electronic shutter function is operational are obtained (output) from the image capturing unit 101, and are used in the flash correction process along with the normal video signal (the primary video signal). In other words, with the imaging apparatus 2, a video signal in which the influence of a flash is properly suppressed is generated by adding the video signal corresponding to a frame image in which the upper portion of the screen is bright due to a flash and the video signal corresponding to a frame image in which the lower portion of the screen is bright due to the flash. Through this, the video (image) obtained by the imaging apparatus 2 is a video (image) in which white band interference caused by an external flash is properly suppressed even when the electronic shutter is operational.

Furthermore, with the imaging apparatus 2, the video signal that is originally discarded (that is, the secondary video signals (the first secondary video signal and the second secondary video signal)) is divided into multiple parts and the flash correction process is then executed; thus, even in the case where external flashes have occurred within a short interval, white band interference occurring in the video signal can be properly suppressed.

Figure 8:
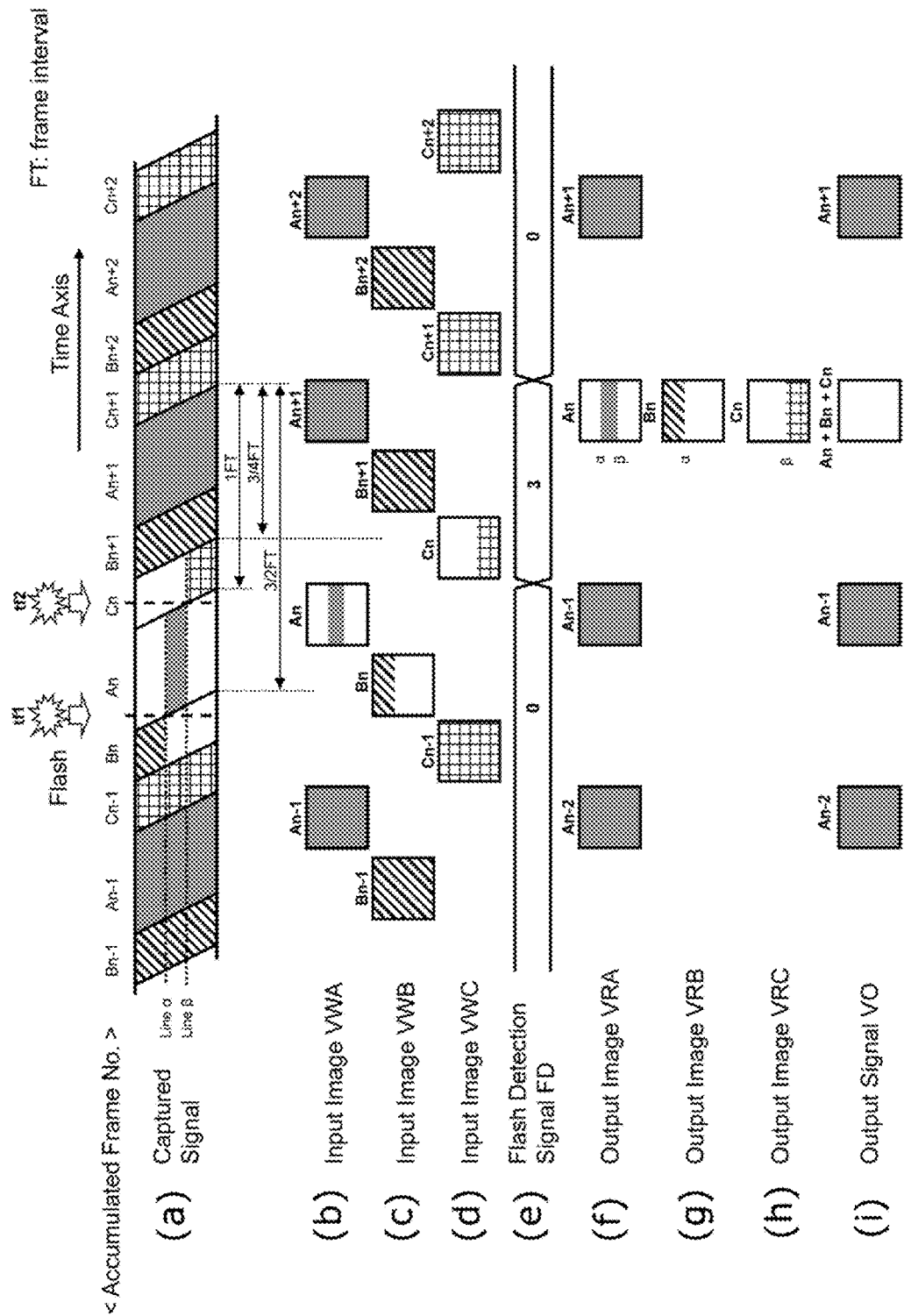
FIG. 8 is a diagram illustrating the state of an image in the various elements of the imaging apparatus according to the second embodiment.
Figure 9:
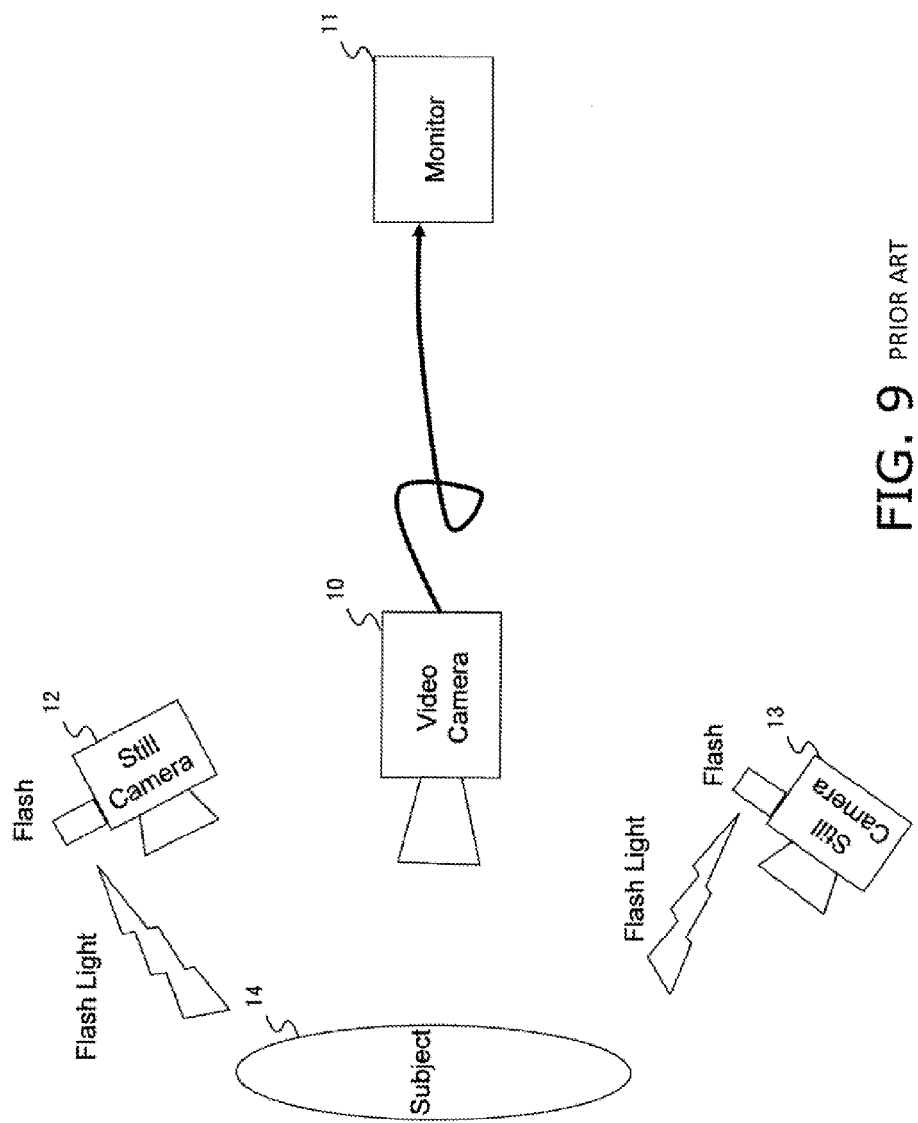
FIG. 9 is a diagram illustrating an image capturing scene in which interference can arise in a captured signal due to an external flash.
Figure 10:
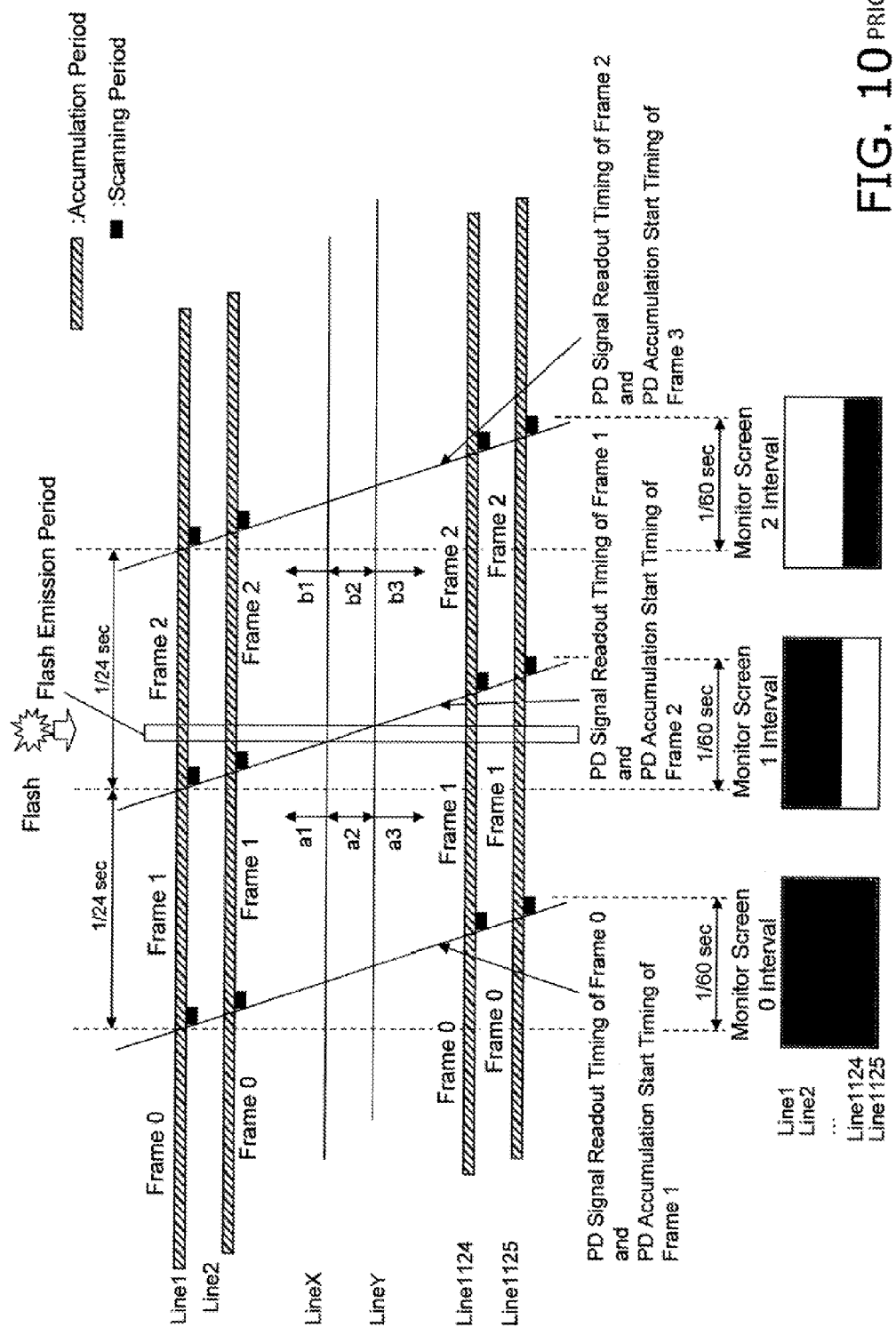
FIG. 10 is a descriptive diagram illustrating the principles behind the occurrence of white band interference caused by an external flash in an imaging apparatus that employs a CMOS image sensor.
Figure 11:
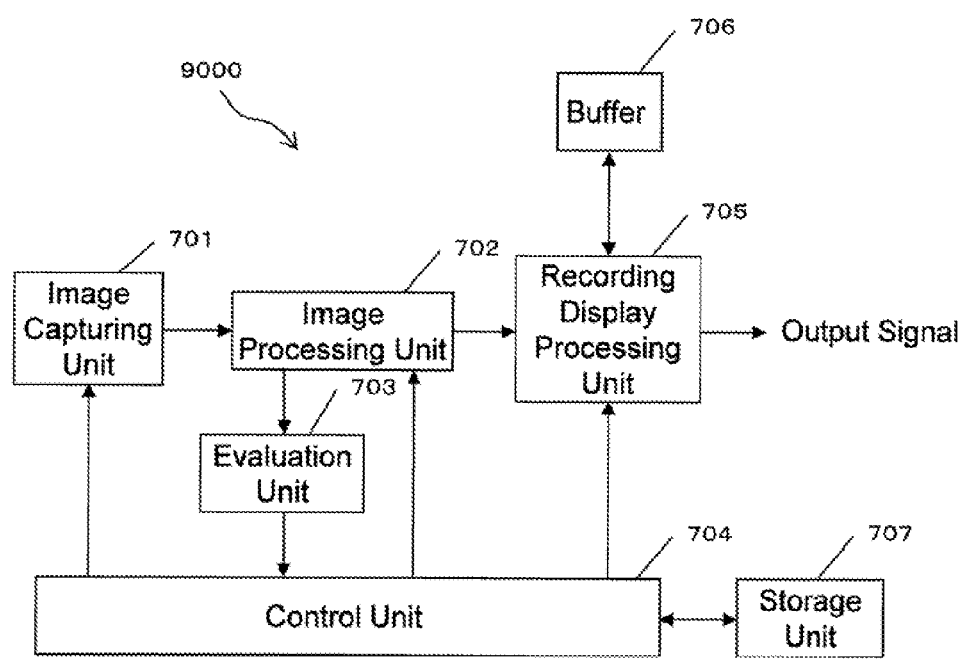
FIG. 11 is a diagram illustrating the general configuration of a conventional imaging apparatus.

In the present embodiment, although the above embodiment describes a case where the imaging apparatus adds one of the image Bn and the image Cn to the image An, the invention is not limited thereto, and the imaging apparatus may add both of the image Bn and the image Cn to the image An. For example, as shown in FIG. 8, when there are flash influences both in the upper portion of the screen and in the lower portion of the screen, the flash detection unit 102 sets the signal value of the flash detection signal FD indicated in FIG. 8(e) to a signal value of "3" indicating that there are flash influences both in the upper portion of the screen and in the lower portion of the screen, and outputs this signal value. The adding unit 203A generates a signal by adding both of the image Bn and the image Cn to the image An. The output selection unit 204 selects the added signal generated by the adding unit 203A, and outputs the selected signal.

Other Embodiments

Although the above embodiments describe cases where there is one set of outputs for the image capturing unit of the imaging apparatus, the present technique is not limited thereto, and there may be two or more sets of outputs for the image capturing unit of the imaging apparatus. For example, if there are two or more sets of outputs for the image capturing unit of the imaging apparatus, the process for reading out one frame's worth of the signal charge of the secondary video signal from the CMOS image sensor can be started before the process for reading out one frame's worth of the signal charge for the primary video signal from the CMOS image sensor has ended. In other words, if there are two or more sets of outputs in the image capturing unit of the imaging apparatus, the time t3 shown in FIG. 6 can occur before the time t2.

Accordingly, if there are two or more sets of outputs in the image capturing unit of the imaging apparatus, the aforementioned flash correction process can be carried out using more secondary video signals (in the second embodiment, the number of secondary video signals is two, but more secondary video signals can be used). As a result, the imaging apparatus can carry out an even more accurate flash correction process.

The various blocks of the imaging apparatus described in the aforementioned embodiments may be implemented as single individual chips by employing semiconductor devices such as LSIs, or some or all of the blocks may be implemented as a single chip.

Note that although the term "LSI" is used here, other names, such as IC, system LSI, super LSI, ultra LSI, and so on are used depending on the degree of integration.

Further, the manner in which the circuit integration is achieved is not limited to LSIs, and it is also possible to use a dedicated circuit or a general purpose processor. FPGAs (Field Programmable Gate Arrays) that can be programmed after the LSI manufacture, configurable processors in which the connections, settings, and so on of circuit cells within the LSIs can be reconfigured, or the like may be used as well.

Furthermore, if other technologies that improve upon or are derived from semiconductor technology enable integration technology to replace LSIs, then naturally it is also possible to integrate the functional blocks using that technology. Biotechnology applications are one such foreseeable example.

Some or all of the processing of the functional blocks of the above embodiments can be implemented by a program. In such a case, some or all of the processing of the functional blocks in the above embodiments are run by a central processing unit (CPU) on a computer. A program for performing the various processes is stored on a memory device such as a hard disk or a ROM, and is run on the ROM or read to and run on a RAM.

In addition, the various processes in the aforementioned embodiments may be realized as hardware, or as software (this includes implementations through an OS (operating system), middleware, or a predetermined library). These processes may also be implemented through processes in which the software and hardware run integrated with one another. It goes without saying that it is necessary to adjust the timing at which to execute each process in the case where the imaging apparatus according to the above embodiments is implemented through hardware. For simplicity's sake, the descriptions in the above embodiments have omitted the details regarding the adjustment of the timing of the various signals that arises in the actual hardware architecture.

In addition, the order of execution in the processing methods of the aforementioned embodiments are not necessarily limited to the descriptions in the aforementioned embodiments, and the order of execution can be interchanged without departing from the spirit of the invention.

A computer program that causes a computer to execute the aforementioned methods and a computer-readable recording medium on which that program has been recorded also fall within the scope of the present invention. Here, a flexible disk, hard disk, CD-ROM, MO, DVD, DVD-ROM, DVD-RAM, BD (Blue-ray Disc), semiconductor memory, and so on can be given as examples of such a computer-readable recording medium.

The stated computer program is not limited to a program stored on the stated recording medium, and may be transmitted via a network or the like such as an electric communication line, a wireless or hard-wired communication line, the Internet, and so on.

It should be noted that the specific configuration of the present invention is not intended to be limited to the above embodiments in any way, and various modifications and variations can be made without deviating from the essential spirit of the invention.

(Appendix)

Note that the present technique can be realized as described below.

A first aspect is an imaging apparatus including an image capturing unit, a flash detection unit, and a flash correction unit.

The image capturing unit alternately outputs one unit image's worth of a primary video signal obtained by capturing a subject image for a first exposure time and one unit image's worth of a secondary video signal obtained by capturing the subject image for a second exposure time. (For example, assuming that the one unit image's worth of sequential primary video signals on the time axis are An−1, An, An+1, and so on, and the one unit image's worth of sequential secondary video signals on the time axis are Bn−1, Bn, Bn+1, and so on, the image capturing unit outputs the one unit image's worth of the primary video signal and the one unit image's worth of the secondary video signal alternately, in the following order: Bn−1, An−1, Bn, An, Bn+1, An+1, and so on.)

The image capturing unit outputs the one unit image's worth of the primary video signal and the one unit image's worth of the secondary video signal at a frame cycle that is longer than both the first exposure time and the second exposure time. For example, the cycle from when the unit image (for example, a frame image) An resulting from the primary video signal is output to when the unit image (for example, a frame image) An+1 resulting from the next primary video signal is output (that is, a frame cycle) is longer than both the first exposure time and the second exposure time.

The flash detection unit determines whether or not the influence of an external flash is present in at least one of the primary video signal and the secondary video signal.

The flash correction unit corrects the influence of the external flash by (1) outputting, in the case where the flash detection unit has determined that the influence of an external flash is present, a flash-corrected video signal obtained by adding, to the primary video signal, the secondary video signal, obtained over the second exposure time, that is temporally before or after the first exposure time over which the primary video signal was obtained, and (2) outputting, in the case where the flash detection unit has determined that the influence of an external flash is not present, the primary video signal.

According to the imaging apparatus configured as described above, a video signal that is originally unnecessary (the secondary video signal) during electronic shutter operations is output by the image capturing unit along with the normal video signal (the primary video signal). With this imaging apparatus, in the case where an upper portion or a lower portion of the screen in a single unit image (for example, a single frame image) formed by the normal video signal (the primary video signal) has become bright due to the influence of an external flash, a single unit image Bn or Bn+1 (for example a frame image Bn or Bn+1) formed by the originally unnecessary video signal (the secondary video signal) obtained temporally before or after a single unit image An (for example, a frame image An) formed by the primary video signal is added to the single unit image An; through this, a unit image (for example, a frame image) in which the influence of the external flash has been suppressed is obtained. In other words, with this imaging apparatus, in the case where the primary video signal has been affected by an external flash, a video signal in which the entire screen is bright can be output as a result of the aforementioned process.

Accordingly, with this imaging apparatus, it is possible to properly suppress white band interference caused by an external flash from occurring in captured images, even during electronic shutter operations.

Note that "one unit image's worth" of a video signal refers to an amount of a video signal capable of forming a single screen (a single image), and corresponds to, for example, an amount of a video signal capable of forming a single frame image.

A second aspect is the first aspect, in which in the case where the flash detection unit has determined that the influence of an external flash is present in an upper portion of an image formed by the primary video signal, the flash correction unit obtains the flash-corrected video signal by adding, to the primary video signal, the secondary video signal, obtained over the second exposure time, that is temporally before the first exposure time over which the primary video signal was obtained.

With this imaging apparatus, in, for example, the case where it has been determined that the influence of an external flash is present in the upper portion of the nth frame image An formed by the primary video signal, an image generated by adding, to the frame image An, a frame image Bn formed by the secondary video signal, obtained over the second exposure time, that is temporally before the first exposure time over which the frame image An was obtained (that is, an image formed by the flash-corrected video signal), can be output. The image formed by this flash-corrected video signal is an image in which the entire screen is bright.

Accordingly, with this imaging apparatus, it is possible to properly suppress white band interference caused by an external flash from occurring in captured images, even during electronic shutter operations.

A third aspect is the first aspect, in which in the case where the flash detection unit has determined that the influence of an external flash is present in a lower portion of an image formed by the primary video signal, the flash correction unit obtains the flash-corrected video signal by adding, to the primary video signal, the secondary video signal, obtained over the second exposure time, that is temporally after the first exposure time over which the primary video signal was obtained.

With this imaging apparatus, in, for example, the case where it has been determined that the influence of an external flash is present in the lower portion of the nth frame image An formed by the primary video signal, an image generated by adding, to the frame image An, a frame image Bn+1 formed by the secondary video signal, obtained over the second exposure time, that is temporally after the first exposure time over which the frame image An was obtained (that is, an image formed by the flash-corrected video signal), can be output. The image formed by this flash-corrected video signal is an image in which the entire screen is bright.

Accordingly, with this imaging apparatus, it is possible to properly suppress white band interference caused by an external flash from occurring in captured images, even during electronic shutter operations.

A fourth aspect is the first aspect, in which in the case where the flash detection unit has determined that the influence of an external flash is present, the flash correction unit determines the secondary video signal to be added to the primary video signal based on the location, in an image formed by the primary video signal, of the image region that is being influenced by the external flash.

A fifth aspect is the first aspect, in which in the case where the flash detection unit has determined that the influence of an external flash is present in the lower portion of an image formed by the secondary video signal, the flash correction unit obtains the flash-corrected video signal by adding, to the secondary video signal, the primary video signal, obtained over the first exposure time, that is temporally after the second exposure time over which the secondary video signal was obtained.

With this imaging apparatus, in, for example, the case where it has been determined that the influence of an external flash is present in the lower portion of the nth frame image Bn formed by the secondary video signal, an image generated by adding, to the frame image Bn, a frame image An formed by the primary video signal, obtained over the first exposure time, that is temporally after the second exposure time over which the frame image Bn was obtained (that is, an image formed by the flash-corrected video signal), can be output. The image formed by this flash-corrected video signal is an image in which the entire screen is bright.

Accordingly, with this imaging apparatus, it is possible to properly suppress white band interference caused by an external flash from occurring in captured images, even during electronic shutter operations.

A sixth aspect is one of the first through fifth aspects, in which the sum of the first exposure time and the second exposure time is equal to the frame cycle.

A seventh aspect is one of the first through fifth aspects, in which the sum of the first exposure time and the second exposure time is less than the frame cycle.

An eighth aspect is an imaging apparatus including an image capturing unit, a flash detection unit, and a flash correction unit.

The image capturing unit alternately outputs one unit image's worth of a primary video signal obtained by capturing a subject image for a first exposure time, one unit image's worth of a first secondary video signal obtained by capturing the subject image for a second exposure time, and one unit image's worth of a second secondary video signal obtained by capturing the subject image for a third exposure time. The image capturing unit outputs the one unit image's worth of the primary video signal, the one unit image's worth of the first secondary video signal, and the one unit image's worth of the second secondary video signal at a frame cycle that is longer than all of the first exposure time, the second exposure time, and the third exposure time.

The flash detection unit determines whether or not the influence of an external flash is present in at least one of the primary video signal, the first secondary video signal, and the second secondary video signal.

The flash correction unit corrects the influence of the external flash by (1) outputting, in the case where the flash detection unit has determined that the influence of an external flash is present, a flash-corrected video signal obtained by adding, to the primary video signal, at least one of the first secondary video signal, obtained over the second exposure time, that is temporally before the first exposure time over which the primary video signal was obtained, and the second secondary video signal, obtained over the third exposure time, that is temporally after the first exposure time over which the primary video signal was obtained, and (2) outputting, in the case where the flash detection unit has determined that the influence of an external flash is not present, the primary video signal.

According to the imaging apparatus configured as described above, a first secondary video signal and a second secondary video signal obtained by dividing the video signal that is originally unnecessary (the secondary video signal) during electronic shutter operations is output by the image capturing unit along with the normal video signal (the primary video signal). With this imaging apparatus, in the case where an upper portion or a lower portion of the screen in a single unit image (for example, a single frame image) formed by the normal video signal (the primary video signal) has become bright due to the influence of an external flash, one of a single unit image Bn or Cn (for example a frame image Bn or Cn) formed by the originally unnecessary video signal (the first secondary video signal and the second secondary video signal) obtained temporally before or after a single unit image An (for example, a frame image An) formed by the primary video signal is added to the single unit image An; through this, a unit image (for example, a frame image) in which the influence of the external flash has been suppressed is obtained. In other words, with this imaging apparatus, in the case where the primary video signal has been affected by an external flash, a video signal in which the entire screen is bright can be output as a result of the aforementioned process.

Accordingly, with this imaging apparatus, it is possible to properly suppress white band interference caused by an external flash from occurring in captured images, even during electronic shutter operations.

A ninth aspect is the eighth aspect, in which in the case where the flash detection unit has determined that the influence of an external flash is present in an upper portion of an image formed by the primary video signal, the flash correction unit obtains the flash-corrected video signal by adding, to the primary video signal, the first secondary video signal, obtained over the second exposure time, that is temporally before the first exposure time over which the primary video signal was obtained.

With this imaging apparatus, in, for example, the case where it has been determined that the influence of an external flash is present in the upper portion of the nth frame image An formed by the primary video signal, an image generated by adding, to the frame image An, a frame image Bn formed by the first secondary video signal, obtained over the second exposure time, that is temporally before the first exposure time over which the frame image An was obtained (that is, an image formed by the flash-corrected video signal), can be output. The image formed by this flash-corrected video signal is an image in which the entire screen is bright.

Accordingly, with this imaging apparatus, it is possible to properly suppress white band interference caused by an external flash from occurring in captured images, even during electronic shutter operations.

A tenth aspect is the eighth aspect, in which in the case where the flash detection unit has determined that the influence of an external flash is present in a lower portion of an image formed by the primary video signal, the flash correction unit obtains the flash-corrected video signal by adding, to the primary video signal, the second secondary video signal, obtained over the third exposure time, that is temporally after the first exposure time over which the primary video signal was obtained.

With this imaging apparatus, in, for example, the case where it has been determined that the influence of an external flash is present in the lower portion of the nth frame image An formed by the primary video signal, an image generated by adding, to the frame image An, a frame image Cn formed by the second secondary video signal, obtained over the third exposure time, that is temporally after the first exposure time over which the frame image An was obtained (that is, an image formed by the flash-corrected video signal), can be output. The image formed by this flash-corrected video signal is an image in which the entire screen is bright.

Accordingly, with this imaging apparatus, it is possible to properly suppress white band interference caused by an external flash from occurring in captured images, even during electronic shutter operations.

An eleventh aspect is an external flash correction method used in an imaging apparatus including an image capturing unit that alternately outputs one unit image's worth of a primary video signal obtained by capturing a subject image for a first exposure time and one unit image's worth of a secondary video signal obtained by capturing the subject image for a second exposure time, the one unit image's worth of the primary video signal and the one unit image's worth of the secondary video signal being output at a frame cycle that is longer than both the first exposure time and the second exposure time. The external flash correction method includes a step of capturing, a step of detecting a flash, and a step of correcting a flash.

In the step of detecting a flash, it is determined whether or not the influence of an external flash is present in at least one of the primary video signal and the secondary video signal.

In the step of correcting a flash, the influence of the external flash is corrected by (1) outputting, in the case where the flash detection unit has determined that the influence of an external flash is present, a flash-corrected video signal obtained by adding, to the primary video signal, the secondary video signal, obtained over the second exposure time, that is temporally before or after the first exposure time over which the primary video signal was obtained, and (2) outputting, in the case where the flash detection unit has determined that the influence of an external flash is not present, the primary video signal.

Through this, it is possible to realize an external flash correction method that achieves the same effects as the first aspect.

A twelfth aspect is a computer-readable recording medium on which is recorded a program for causing a computer to execute an external flash correction method used in an imaging apparatus including an image capturing unit that alternately outputs one unit image's worth of a primary video signal obtained by capturing a subject image for a first exposure time and one unit image's worth of a secondary video signal obtained by capturing the subject image for a second exposure time, the one unit image's worth of the primary video signal and the one unit image's worth of the secondary video signal being output at a frame cycle that is longer than both the first exposure time and the second exposure time. The external flash correction method includes a step of capturing, a step of detecting a flash, and a step of correcting a flash.

In the step of detecting a flash, it is determined whether or not the influence of an external flash is present in at least one of the primary video signal and the secondary video signal.

In the step of correcting a flash, the influence of the external flash is corrected by (1) outputting, in the case where the flash detection unit has determined that the influence of an external flash is present, a flash-corrected video signal obtained by adding, to the primary video signal, the secondary video signal, obtained over the second exposure time, that is temporally before or after the first exposure time over which the primary video signal was obtained, and (2) outputting, in the case where the flash detection unit has determined that the influence of an external flash is not present, the primary video signal.

Through this, it is possible to realize a program for causing a computer to execute an external flash correction method that achieves the same effects as the first aspect.

A thirteenth aspect is an integrated circuit used in an imaging apparatus including an image capturing unit that alternately outputs one unit image's worth of a primary video signal obtained by capturing a subject image for a first exposure time and one unit image's worth of a secondary video signal obtained by capturing the subject image for a second exposure time, the one unit image's worth of the primary video signal and the one unit image's worth of the secondary video signal being output at a frame cycle that is longer than both the first exposure time and the second exposure time; the integrated circuit includes a flash detection unit and a flash correction unit.

The flash detection unit determines whether or not the influence of an external flash is present in at least one of the primary video signal and the secondary video signal.

The flash correction unit corrects the influence of the external flash by (1) outputting, in the case where the flash detection unit has determined that the influence of an external flash is present, a flash-corrected video signal obtained by adding, to the primary video signal, the secondary video signal, obtained over the second exposure time, that is temporally before or after the first exposure time over which the primary video signal was obtained, and (2) outputting, in the case where the flash detection unit has determined that the influence of an external flash is not present, the primary video signal.

Through this, it is possible to realize an integrated circuit that achieves the same effects as the first aspect.

The imaging apparatus, external flash correction method, program, and integrated circuit according to the present technique can detect and correct white band interference occurring when capturing a subject that has been illuminated by a flash, which is a problem unique to imaging apparatuses that use CMOS image sensors, such as those recently being used in video cameras. Therefore, the present technique is useful in video device-related industrial fields, and the present technique can be applied in such fields.

What is claimed is:

1. An imaging apparatus comprising:
   an image capturing unit that alternately outputs one unit image's worth of a primary video signal obtained by capturing a subject image for a first exposure time and one unit image's worth of a secondary video signal obtained by capturing the subject image for a second exposure time, the one unit image's worth of the primary video signal and the one unit image's worth of the secondary video signal being output at a frame cycle that is equal or longer than sum of the first exposure time and the second exposure time;
   a flash detection unit that determines whether or not the influence of an external flash is present in at least one of the primary video signal and the secondary video signal; and
   a flash correction unit that corrects the influence of the external flash by (1) outputting, in the case where the flash detection unit has determined that the influence of an external flash is present, a flash-corrected video signal obtained by adding, to the primary video signal, the secondary video signal, obtained over the second exposure time, that is temporally before or after the first exposure time over which the primary video signal was obtained, and (2) outputting, in the case where the flash detection unit has determined that the influence of an external flash is not present, the primary video signal.

2. The imaging apparatus according to claim 1,
wherein in the case where the flash detection unit has determined that the influence of an external flash is present in an upper portion of an image formed by the primary video signal, the flash correction unit obtains the flash-corrected video signal by adding, to the primary video signal, the secondary video signal, obtained over the second exposure time, that is temporally before the first exposure time over which the primary video signal was obtained.

3. The imaging apparatus according to claim 1,
wherein in the case where the flash detection unit has determined that the influence of an external flash is present in a lower portion of an image formed by the primary video signal, the flash correction unit obtains the flash-corrected video signal by adding, to the primary video signal, the secondary video signal, obtained over the second exposure time, that is temporally after the first exposure time over which the primary video signal was obtained.

4. The imaging apparatus according to claim 1,
wherein in the case where the flash detection unit has determined that the influence of an external flash is present, the flash correction unit determines the secondary video signal to be added to the primary video signal based on the location, in an image formed by the primary video signal, of the image region that is being influenced by the external flash.

5. The imaging apparatus according to claim 1,
wherein in the case where the flash detection unit has determined that the influence of an external flash is present in the lower portion of an image formed by the secondary video signal, the flash correction unit obtains the flash-corrected video signal by adding, to the secondary video signal, the primary video signal, obtained over the first exposure time, that is temporally after the second exposure time over which the secondary video signal was obtained.

6. An imaging apparatus comprising:
an image capturing unit that alternately outputs one unit image's worth of a primary video signal obtained by capturing a subject image for a first exposure time, one unit image's worth of a first secondary video signal obtained by capturing the subject image for a second exposure time, and one unit image's worth of a second secondary video signal obtained by capturing the subject image for a third exposure time, one unit image's worth of the primary video signal, the one unit image's worth of the first secondary video signal, and the one unit image's worth of the second secondary video signal being output at a flame cycle that is equal or longer than sum of the first exposure time, the second exposure time, and the third exposure time;
a flash detection unit that determines whether or not the influence of an external flash is present in at least one of the primary video signal, the first secondary video signal, and the second secondary video signal; and
a flash correction unit that corrects the influence of the external flash by (1) outputting, in the case where the flash detection unit has determined that the influence of an external flash is present, a flash-corrected video signal obtained by adding, to the primary video signal, at least one of the first secondary video signal, obtained over the second exposure time, that is temporally before the first exposure time over which the primary video signal was obtained, and the second secondary video signal, obtained over the third exposure time, that is temporally after the first exposure time over which the primary video signal was obtained, and (2) outputting, in the case where the flash detection unit has determined that the influence of an external flash is not present, the primary video signal.

7. The imaging apparatus according to claim 6,
wherein in the case where the flash detection unit has determined that the influence of an external flash is present in an upper portion of an image formed by the primary video signal, the flash correction unit obtains the flash-corrected video signal by adding, to the primary video signal, the first secondary video signal, obtained over the second exposure time, that is temporally before the first exposure time over which the primary video signal was obtained.

8. The imaging apparatus according to claim 6,
wherein in the case where the flash detection unit has determined that the influence of an external flash is present in a lower portion of an image formed by the primary video signal, the flash correction unit obtains the flash-corrected video signal by adding, to the primary video signal, the second secondary video signal, obtained over the third exposure time, that is temporally after the first exposure time over which the primary video signal was obtained.

9. An external flash correction method used in an imaging apparatus including an image capturing unit that alternately outputs one unit image's worth of a primary video signal obtained by capturing a subject image for a first exposure time and one unit image's worth of a secondary video signal obtained by capturing the subject image for a second exposure time, the one unit image's worth of the primary video signal and the one unit image's worth of the secondary video signal being output at a frame cycle that is equal or longer than sum of the first exposure time and the second exposure time, the method comprising:
determining whether or not the influence of an external flash is present in at least one of the primary video signal and the secondary video signal; and
correcting the influence of the external flash by (1) outputting, in the case where it has been determined that the influence of an external flash is present, a flash-corrected video signal by adding, to the primary video signal, the secondary video signal, obtained over the second exposure time, that is temporally before or after the first exposure time over which the primary video signal was obtained, and (2) outputting, in the case where it has been determined that the influence of an external flash is not present, the primary video signal.

10. A non-transitory computer-readable recording medium on which is recorded a program that causes a computer to execute an external flash correction method used in an imaging apparatus including an image capturing unit that alternately outputs one unit image's worth of a primary video signal obtained by capturing a subject image for a first exposure time and one unit image's worth of a secondary video signal obtained by capturing the subject image for a second exposure time, the one unit image's worth of the primary video signal and the one unit image's worth of the secondary video signal being output at a frame cycle that is equal or longer than sum of the first exposure time and the second exposure time, the method, the method comprising:
determining whether or not the influence of an external flash is present in at least one of the primary video signal and the secondary video signal; and
correcting the influence of the external flash by (1) outputting, in the case where it has been determined that the influence of an external flash is present, a flash-corrected video signal by adding, to the primary video signal, the secondary video signal, obtained over the second exposure time, that is temporally before or after the first exposure time over which the primary video signal was obtained, and (2) outputting, in the case where it has been determined that the influence of an external flash is not present, the primary video signal.

11. An integrated circuit used in an imaging apparatus including an image capturing unit that alternately outputs one unit image's worth of a primary video signal obtained by capturing a subject image for a first exposure time and one unit image's worth of a secondary video signal obtained by capturing the subject image for a second exposure time, the one unit image's worth of the primary video signal and the one unit image's worth of the secondary video signal being output at a frame cycle that is equal or longer than sum of the first exposure time and the second exposure time, and the integrated circuit comprising:

a flash detection unit that determines whether or not the influence of an external flash is present in at least one of the primary video signal and the secondary video signal; and a flash correction unit that corrects the influence of the external flash by (1) outputting, in the case where the flash detection unit has determined that the influence of an external flash is present, a flash-corrected video signal by adding, to the primary video signal, the secondary video signal, obtained over the second exposure time, that is temporally before or after the first exposure time over which the primary video signal was obtained, and (2) outputting, in the case where the flash detection unit has determined that the influence of an external flash is not present, the primary video signal.

* * * * *